US006490925B2

(12) United States Patent
Inoue et al.

(10) Patent No.: US 6,490,925 B2
(45) Date of Patent: Dec. 10, 2002

(54) PIEZOELECTRIC VIBRATION GYROSCOPE AND METHOD FOR ADJUSTING RESONANCE FREQUENCIES OF SAME

(75) Inventors: Takeshi Inoue, Tokyo (JP); Mitsuru Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 3 days.

(21) Appl. No.: 09/797,805

(22) Filed: Mar. 5, 2001

(65) Prior Publication Data

US 2001/0020388 A1 Sep. 13, 2001

(30) Foreign Application Priority Data

Mar. 7, 2000 (JP) ....................................... 2000-062528

(51) Int. Cl.[7] .................................................. G01P 9/04
(52) U.S. Cl. ..................................... 73/504.16; 310/370
(58) Field of Search ......................... 73/504.16, 504.12, 73/504.14, 504.15, 504.04, 504.02; 310/321, 329, 370

(56) References Cited

U.S. PATENT DOCUMENTS 5,533,397 A * 7/1996 Sugitani et al. .......... 73/504.16
5,635,642 A * 6/1997 Nonomura et al. ...... 73/504.16

FOREIGN PATENT DOCUMENTS

JP 8-128830 5/1996

OTHER PUBLICATIONS

"Elasticwave device hand book" (OHM Co., Ltd.) pp. 491–497, date unknown.

* cited by examiner

*Primary Examiner*—Helen Kwok
(74) *Attorney, Agent, or Firm*—Sughrue Mion, PLLC

(57) ABSTRACT

A piezoelectric vibration gyroscope is composed of a main body shaped into a rectangular plate and provided with obverse and reverse surfaces functioning as major surfaces, and the first and second groups of three arms projecting from the main body in opposite directions and lying on extensions of the major surfaces. The first group of the three arms is composed of two excitation driving side arms excited in an opposite phase and a nonexcitation driving side arm inserted between the two excitation driving side arms. The second group of the three arms is composed of two vibration detecting side arms vibrating in an opposite phase and a nonvibration detecting side arm inserted between the two vibration detecting side arms. The excitation driving side arms are respectively provided with driving electrodes for exciting a tangential vibration therein. The vibration detecting side arms are respectively provided with detecting electrodes for detecting a vertical vibration. The main body prevents the tangential vibration from transitting from the excitation driving side arms to the vibration detecting side arms. The vertical vibration is generated in the excitation driving electrodes because of Coriolis force caused by an anglar velocity of the piezoelectric vibration gyroscope.

11 Claims, 14 Drawing Sheets

3c NONEXCITATION DRIVING SIDE ARM
3a EXCITATION DRIVING SIDE ARM
3b EXCITATION DRIVING SIDE ARM
3 DRIVING SIDE ARMS
5
5 DRIVING ELECTRODE
2 MAIN BODY
2a MAJOR SURFACE
4 DETECTING SIDE ARMS
4a VIBRATION DETECTING SIDE ARM
4b VIBRATION DETECTING SIDE ARM
6
6 DETECTING ELECTRODE
4c NONVIBRATION DETECTING SIDE ARM z
Ω
y
x
102
RIGHT
ARM
103
LEFT
ARM
100
PIEZOELECTRIC
VIBRATION
GYROSCOPE
101a
MAJOR
SURFACE
101
BASE z
Ω
y
x
Fc
CORIOLIS
FORCE
Fc
102
103
100
101a
101

3c
NONEXCITATION
DRIVING
SIDE ARM
3b
3a
EXCITATION
DRIVING
SIDE ARM
3a
3b
EXCITATION
DRIVING
SIDE ARM
1
3
DRIVING
SIDE ARMS
2a
MAJOR
SURFACE
2
MAIN BODY
4
DETECTING
SIDE ARMS
4a
VIBRATION
DETECTING
SIDE ARM
4b
VIBRATION
DETECTING
SIDE ARM
4c
NONVIBRATION
DETECTING
SIDE ARM

3a
EXCITATION
DRIVING
SIDE ARM
3
DRIVING
SIDE ARMS
3c
NONEXCITATION
DRIVING
SIDE ARM
3b
EXCITATION
DRIVING
SIDE ARM
1
2
MAIN BODY
2a
MAJOR
SURFACE
4
DETECTING
SIDE ARMS
4a
4b
4b
VIBRATION
DETECTING
SIDE ARM
4a
VIBRATION
DETECTING
SIDE ARM
4c
NONVIBRATION
DETECTING
SIDE ARM

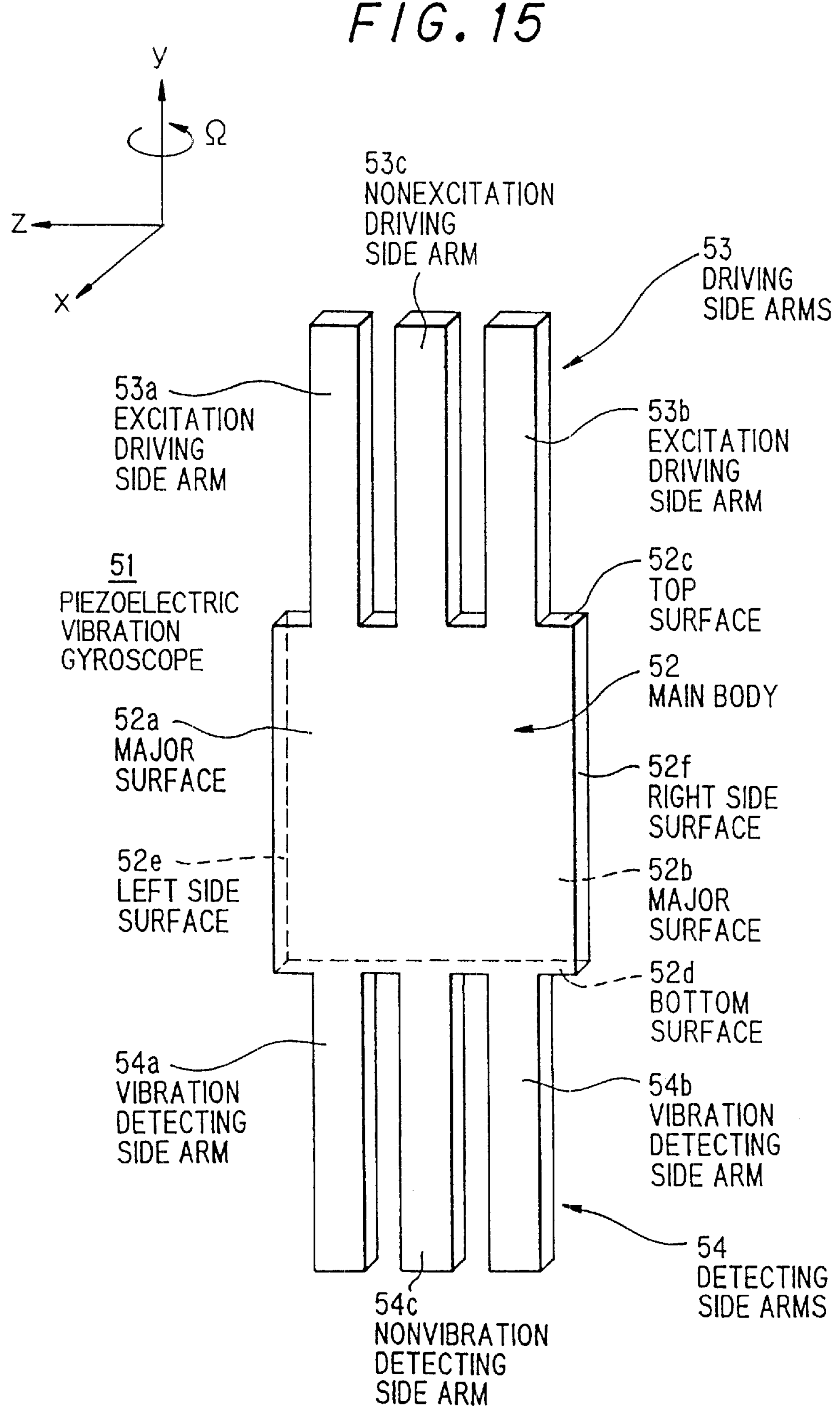
FIG. 15
y
Ω
Z
X
53c
NONEXCITATION
DRIVING
SIDE ARM
53
DRIVING
SIDE ARMS
53a
EXCITATION
DRIVING
SIDE ARM
53b
EXCITATION
DRIVING
SIDE ARM
51
PIEZOELECTRIC
VIBRATION
GYROSCOPE
52c
TOP
SURFACE
52
MAIN BODY
52a
MAJOR
SURFACE
52f
RIGHT SIDE
SURFACE
52e
LEFT SIDE
SURFACE
52b
MAJOR
SURFACE
52d
BOTTOM
SURFACE
54a
VIBRATION
DETECTING
SIDE ARM
54b
VIBRATION
DETECTING
SIDE ARM
54
DETECTING
SIDE ARMS
54c
NONVIBRATION
DETECTING
SIDE ARM

PIEZOELECTRIC VIBRATION GYROSCOPE AND METHOD FOR ADJUSTING RESONANCE FREQUENCIES OF SAME

FIELD OF THE INVENTION

The invention relates to a vibration gyroscope of a tuning fork type formed of piezoelectric material to be used as a piezoelectric vibration gyroscope, and a method for adjusting resonance frequencies of the same.

BACKGROUND OF THE INVENTION

In general, a vibration gyroscope is known as a device for measuring an angular velocity of a rotating object mounting a vibrating object thereon by making use of a phenomenon that Coriolis force which is vertical to both a vector of the angular velocity and that of the vibration exerts on the vibrating object, and has been used as the device for confirming a position of an aircraft, a vessel or a space orbiter.

Recently, the vibration gyroscope has come to be used for various commercial purposes, such as positioning in a car navigation, control of an attitude of an automobile, or detection of deflection of a camera for a VTR or a still picture.

In the aforementioned vibration gyroscope, a driving voltage is impressed upon this device to excite a driving vibration, and a detecting vibration caused by Coriolis force is detected electrically. The vibration gyroscope of the aforementioned type are classified into a Sperry tuning fork gyroscope, a Watson tuning fork gyroscope, a rectangular metal plate tuning fork gyroscope, a cylindrical vibration gyroscope, etc. as shown in "Elasticwave device hand book" (OHM Co.Ltd) pp.491 to pp.497.

Heretofore, a piezoelectric vibration gyroscope of this kind has been disclosed in Japanese Patent Applications Laid-Open No.8-128830, in which a tuning fork gyroscope with high performance formed of lithium tantalate is made public.

The aforementioned piezoelectric vibration gyroscope will be explained referring to FIGS. 1A, 1B.

As shown in these drawings, a piezoelectric vibration gyroscope 100 is composed of a base 101 having a rectangular major surface 101 a and right and left arms 102, 103 projecting from both side ends of the base 101 on the same sides thereof, and all these structural elements constitutes a gyroscope of a tuning fork type. The right and left arms 102, 103 are respectively provided with driving electrodes for exciting a vibration and detecting electrodes for detecting the vibration (both the electrodes are not shown).

Next, the operation of the piezoelectric vibration gyroscope mentioned in the above will be explained referring to FIGS. 1A, 1B.

If a driving voltage is impressed upon the electrodes on the right arm 102, the arm 102 vibrates from right to left in a plane running in parallel with the major surface 101*a* of the piezoelectric vibration gyroscope 100. When the right arm 102 vibrates, the vibration is transmitted to the left arm 103 via the base 101, and the arms 102, 103 start a tangential vibration. That is to say, these arms repeat such movements that the arms 102, 103 are close to and remote from each other in a plane running in parallel with the major surface 101*a* of the piezoelectric vibration gyroscope 100. The tangential vibration is one of characteristic modes of the piezoelectric vibration gyroscope 100, and functions as a driving vibration mode in this example.

At this time, if the piezoelectric vibration gyroscope 100 is fixed to a rotating object which rotates around the Z axis (a direction of projection of the arms 102, 103) shown in FIG. 1A at an angular velocity of Ω, Coriolis forces Fc vertical to the major surface 101*a* exert on the arms 102, 103.

Accordingly, the vertical vibration is excited in the arms 102, 103 because of Coriolis forces Fc, and thereby these arms repeat such a movement that they are displaced in the opposite directions vertically to the major surface 101*a*. The vertical vibration is another one of the characteristic vibration modes of the piezoelectric vibration gyroscope 100 also, and functions as a detecting vibration mode in this example.

In order to detect the angular velocity Ω of the rotating object around the Z axis, the vertical vibration of the detecting vibration mode is detected through a difference in a potential between the detecting electrodes formed on the arm 103.

However, on the conventional piezoelectric vibration gyroscope mentioned in the above, since there is no nodal (unmoved) point of both the driving and detecting vibration modes, not only the vertical vibration (the detecting vibration mode) but also the tangential vibration (the driving vibration mode) are excited in the left arm 103. Moreover, since both the arms 102, 103 project on the same side, these arms are situated closely to each other.

As a result, the driving and detecting modes interfere with each other. That is to say, a mechanical coupling occurs between the arms 102, 103. Moreover, a voltage impressed upon the driving electrodes interferes with a detecting current flowing through the detecting electrodes, hence an electrostatical coupling occurs between the driving and detecting electrodes. Accordingly, an electromechanical coupling occurs between the driving and detecting electrodes, which causes a noise interfering with the detection, deteriorates a S/N ratio, and lowers a resolution of the angular velocity.

Accordingly, it is an object of the invention to provide a piezoelectric vibration gyroscope and a method for adjusting resonance frequencies of driving and detecting modes of the same, in which an angular velocity of a rotating object is detected under a satisfactory S/N ratio, and a resolution of an angular velocity is heightened.

According to the first feature of the invention, a piezoelectric vibration gyroscope comprises:

a main body shaped into a rectangular plate and provided with obverse and reverse surfaces functioning as major surfaces, and first and second groups of three arms projecting from the main body in opposite directions and lying on extensions of the major surfaces, wherein the main body and the first and second groups of the three arms are formed of piezoelectric material, the first group of the three arms is composed of two excitation driving side arms excited in an opposite phase and a nonexcitation driving side arm inserted between the two excitation driving side arms, the second group of the three arms is composed of two vibration detecting side arms vibrating in an opposite phase and a nonvibration detecting side arm inserted between the two vibration detecting side arms, the two excitation driving side arms are respectively provided with driving electrodes for exciting a tangential vibration vibrating in parallel with the major surfaces, and the two vibration driving side arms are respectively provided with detecting electrodes for detecting a vertical vibration vibrating vertically to the major surfaces.

Accordingly, when the whole gyroscope is situated on a rotating object and a driving voltage is impressed upon the excitation driving side arms to excite a tangential vibration, the vertical vibration is generated in the excitation driving side arms because of Coriolis force, and the vertical vibration is transmitted to the vibration detecting side arms via the main body to excite the vertical vibration therein.

In the piezoelectric vibration gyroscope according to another aspect of the invention, the main body is shaped into the rectangular plate so that a transmission of the tangential vibration from the excitation driving side arms to the vibration detecting side arms can be suppressed.

Accordingly, even when the tangential vibration is excited in the excitation driving side arms, the main body prevents the tangential vibration from being transmitted to the vibration detecting side arms.

In the piezoelectric vibration gyroscope according to another aspect of the invention, the main body and the first and second groups of the three arms are formed into one united body.

The frequency characteristic of the aforementioned piezoelectric vibration gyroscope is more excellent than that of a piezoelectric vibration gyroscope in which the arms are connected with the main body via joints.

In the piezoelectric vibration gyroscope according to another aspect of the invention, the excitation and nonexcitation driving side arms and the vibration and nonvibration detecting side arms are formed either of Z cut quartz or a Z cut langasite, and have a rectangular shaped cross-section, each of front, rear, right side and left side surfaces (vertical surfaces, hereinafter) of each of the excitation driving side arms is provided with the driving electrode, which extends from a neighborhood of a starting end of the excitation driving side arm towards a terminal end thereof running along a center line of the vertical surface and maintaining predetermined dimensions, and each of right and left side surfaces of each of the vibration detecting side arms is provided with a pair of strip shaped detecting electrodes having same dimensions, which extends from a neighborhood of a starting end of the vibration detecting side arm towards a terminal end thereof running along both side edges of the vertical surface and maintaining predetermined dimensions.

If the driving electrodes are so connected with an AC power supply that the driving electrodes situated opposite to each other are in the same polarity and the adjacent driving electrodes are in the opposite polarity, the tangential vibration is excited in the excitation driving side arms.

Moreover, if the detecting electrodes are so connected with a detecting device that the detecting electrodes situated on the same diagonal are in the same polarity and the detecting electrodes situated on the same surface are in the opposite polarity, the vertical vibration in the vibration detecting side arms can be detected.

In the piezoelectric vibration gyroscope according to another aspect of the invention, a length of said driving electrode is forty to seventy percent of that of said excitation driving side arm, a width of the driving electrode is fifty to seventy percent of that of the excitation driving side arm, a length of the detecting electrode is forty to seventy percent of that of the vibration detecting side arm, and double width of the detecting electrode is thirty to fifty percent of a width of the vibration detecting side arm.

Accordingly, in case that piezoelectric material is formed of Z cut quartz or Z cut langasite, displacements of the vibration detecting side arms can be detected with high sensitivity because of a high electromechanical coupling efficient.

In the piezoelectric vibration gyroscope according to another aspect of the invention, the excitation and nonexcitation driving side arms and the vibration and nonvibration detecting side arms are formed of material of one kind selected from X cut quartz, X cut langasite, and 130° rotated Y plate lithium tantalate, and have a rectangular shaped cross-section, each of front and rear surfaces of each of the excitation driving side arms is provided with a pair of strip shaped driving electrodes having same dimensions, which extends from a neighborhood of a starting end of the excitation driving side arm towards a terminal end thereof running along both side edges of the front or rear surface and maintaining predetermined dimensions, and each of front, rear, right side, and left side surfaces (vertical surfaces, hereinafter) of each of the vibration detecting side arms is provided with a detecting electrode, which extends from a neighborhood of a starting end of the vibration detecting arm towards terminal end thereof running along a center line of the vertical surface and maintaining predetermined dimensions.

Accordingly, if the driving electrodes are so connected with an AC power supply that the driving electrodes situated on the same diagonal are in the same polarity and the driving electrode situated opposite to each other and the driving electrodes situated on the same surface are in the opposite polarity, the tangential vibration is excited in the excitation driving side arms.

Moreover, if the detecting electrodes are so connected with the detecting device that the detecting electrodes situated opposite to each other are in the same polarity, and the adjacent detecting electrodes are in the opposite polarity, an amplitude of the vertical vibration in the vibration detecting side areas can be detected.

In the piezoelectric vibration gyroscope according to another aspect of the invention, a length of the driving electrode is forty to seventy percent of that of the excitation driving side arm, double width of the driving electrode is thirty to fifty percent of a width of the excitation driving side arm, a length of the detecting electrode is forty to seventy percent of that of the vibration detecting side arm, and a width of the detecting electrode is fifty to seventy percent of that of the vibration detecting side arm.

Accordingly, in case that piezoelectric material is formed of X cut quartz, X cut langasite, 130° rotated Y plate lithium tantalate or piezoelectric ceramics, displacements in the detecting side arms can be detected because of a high effective electromechanical coupling coefficient.

In the piezoelectric vibration gyroscope according to another aspect of the invention, a whole gyroscope is constructed so as to be symmetrical with respect to both horizontal and vertical axes thereof, and a thickness of the main body is a same as those of the excitation and nonexcitation driving side arms and the vibration and nonvibration detecting side arms.

a thickness of the main body is a same as those of the excitation and nonexcitation driving side arms and the vibration and nonvibration detecting side arms.

Accordingly, a structure of the piezoelectric vibration gyroscope which is free from spurious response and has satisfactory frequency response can be obtained easily.

In the piezoelectric vibration gyroscope according to another aspect of the invention, the piezoelectric vibration gyroscope is provided with the first and second supporting members, wherein:

the first supporting member is situated on the first boundary between the nonexcitation driving side arm and the main body, and the second supporting member is situated on the second boundary between the main body and the nonvibration detecting side arm.

Accordingly, the piezoelectric vibration gyroscope can be supported maintaining a high stability by means of the supporting members fixed to the piezoelectric vibration gyroscope at positions where displacements thereof are extremely small.

In the piezoelectric vibration gyroscope according to another aspect of the invention, the piezoelectric vibration gyroscope is provided with a supporting member situated on a center of gravity thereof.

Accordingly, the whole structure of the piezoelectric vibration gyroscope can be supported with improved stability by means of the supporting member fixed to this device at a center of gravity thereof where the displacement due to the vibration is the smallest.

According to the second feature of the invention, a method for adjusting a difference in a resonance frequency between a tangential vibration and a vertical vibration of a piezoelectric vibration gyroscope, which comprises:

a main body shaped into a rectangular plate and provided with obverse and reverse surfaces functioning as major surfaces, and first and second groups of three arms projecting from the main body in opposite directions and lying on extensions of the major surfaces, wherein the main body and the first and second groups of the three arms are formed of piezoelectric material, the first group of the three arms is composed of two excitation driving side arms vibrating in an opposite phase and a nonexcitation driving side arm inserted between the two excitation driving side arms, the second group of the three arms is composed of two vibration detecting side arms vibrating in an opposite phase and a non vibration detecting side arm inserted between the two vibration detecting side arms, the two excitation driving side arms are respectively provided with driving electrodes for exciting a tangential vibration vibrating in parallel with the major surfaces, and the two vibration driving side arms are respectively provided with detecting electrodes for detecting a vertical vibration vibrating vertically to the major surfaces, comprises the step of:

cutting four corners of the main body.

When the four corners of the main body are cut, lowering of the resonance frequency of the vertical vibration is more noticeable than that of the tangential vibration.

BRIEF DESCRIPTION OF THE DRAWINGS

The invention will be explained in more detail in conjunction with the appended drawings, wherein:

FIG. 15 is a perspective view for showing a piezoelectric vibration gyroscope according to the second preferred embodiment of the invention.

DESCRIPTION OF THE PREFERRED EMBODIMENTS

Hereafter, embodiments of the invention will be explained referring to the appended drawings.

Figure 1A:
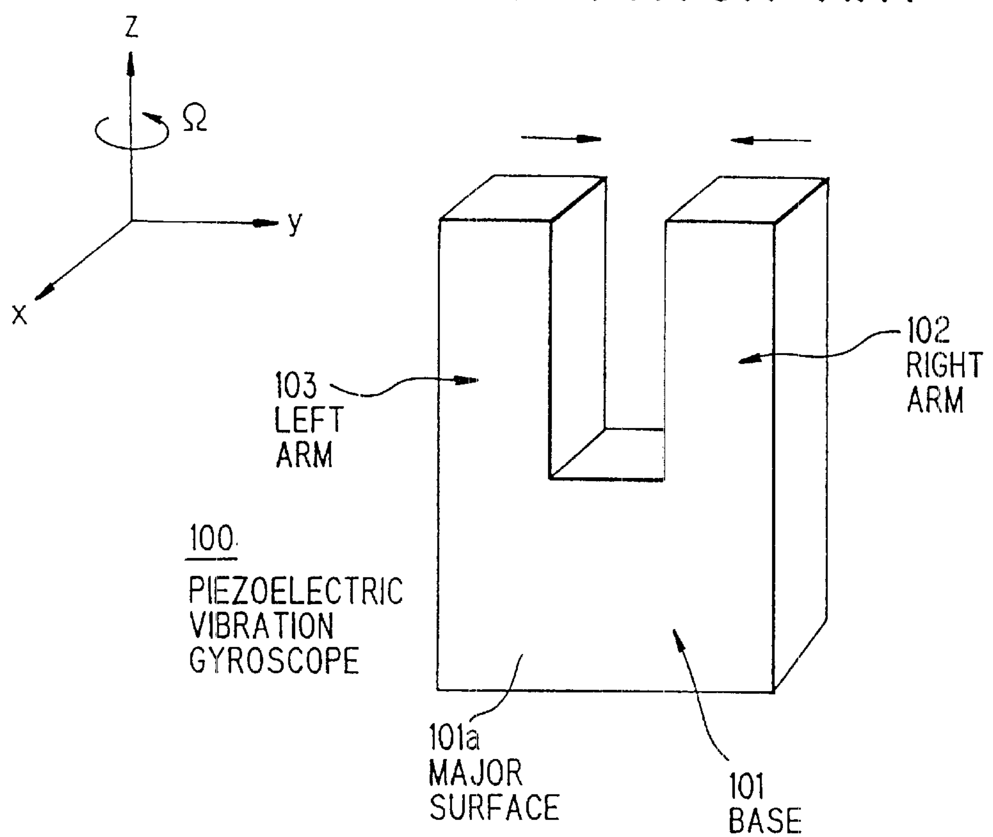
FIGS. 1A, 1B are perspective views for respectively showing a state of a vibration of a driving mode and that of a detecting mode in a conventional piezoelectric vibration gyroscope of a tuning fork type.
Figure 1B:
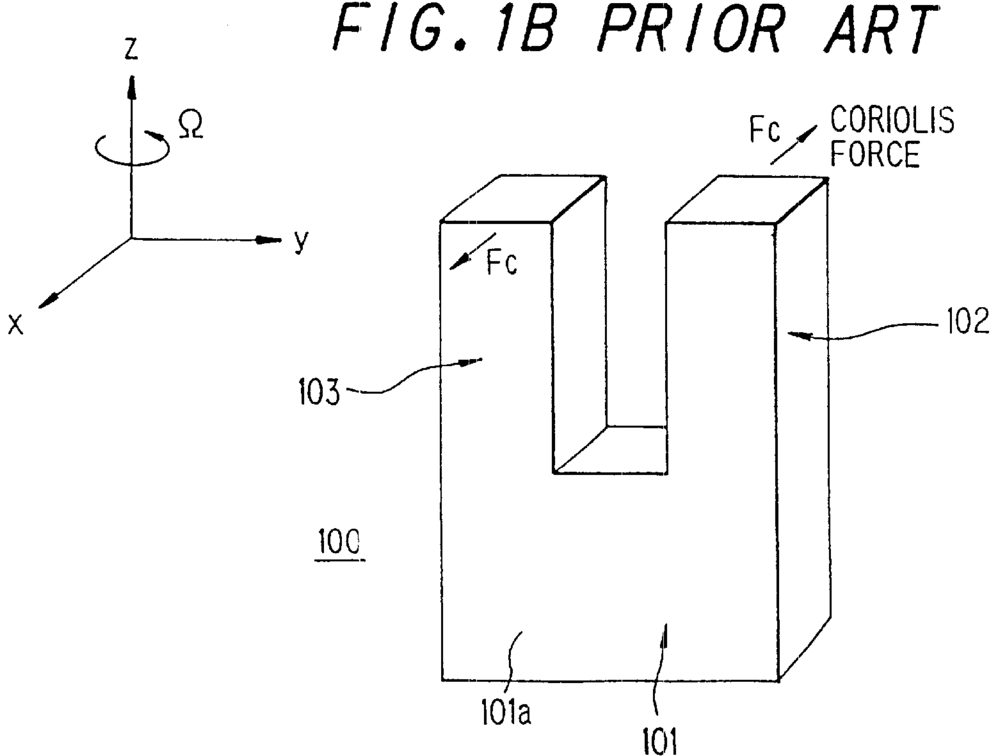
Figure 2:
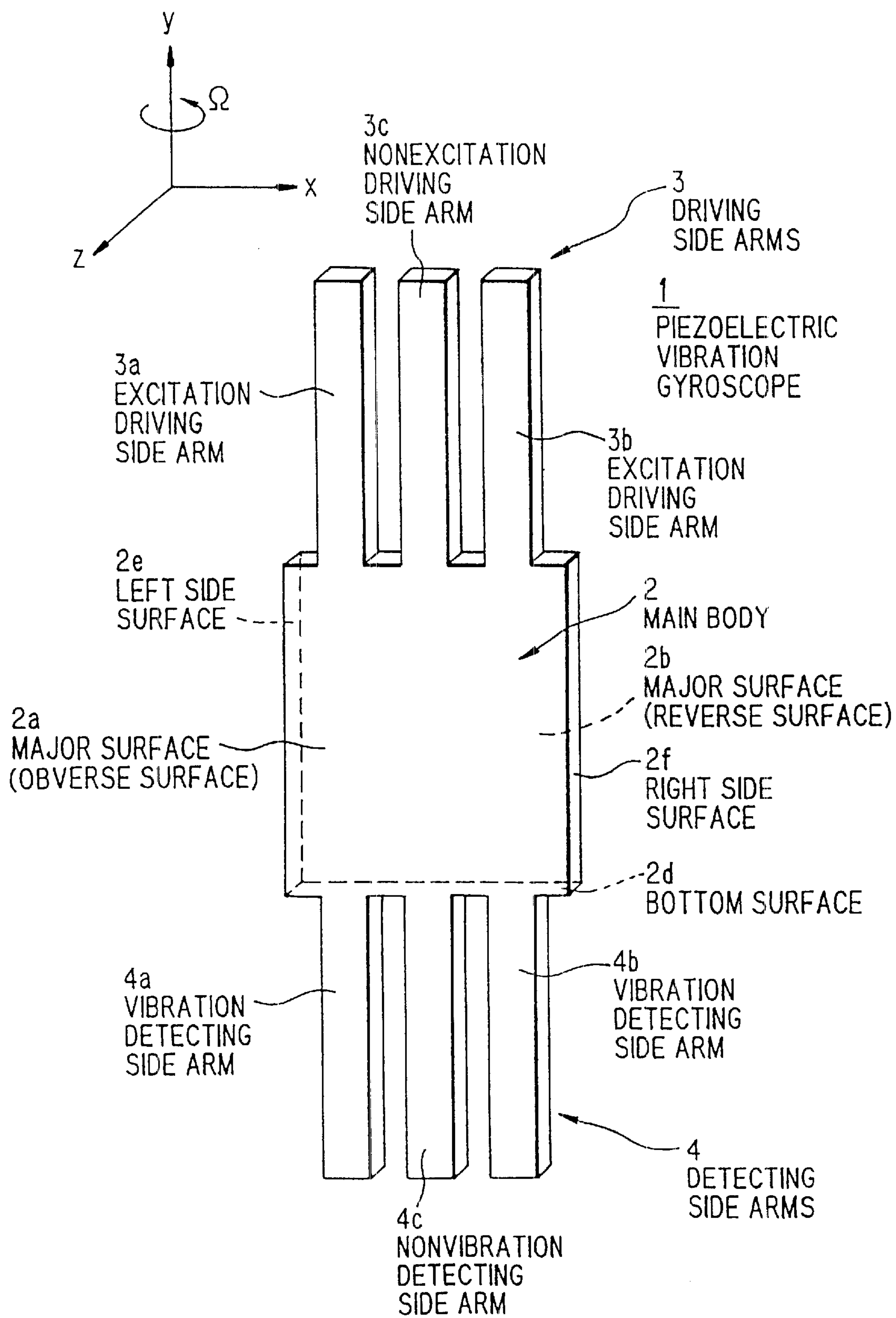
FIG. 2 is a perspective view for showing a piezoelectric vibration gyroscope according to the first preferred embodiment of the invention.

FIG. 2 is a perspective view for showing a piezoelectric vibrating gyroscope according to the first preferred embodiment of the invention. In FIG. 2, a piezoelectric vibration gyroscope using a double trident tuning fork denoted by a reference numeral 1 is composed of a main body 2, driving side arms 3, and detecting side arms 4. The piezoelectric vibration gyroscope 1 is constructed so as to be symmetrical with respect to both the horizontal and vertical axes, and formed of piezoelectric material, such as Z cut langasite.

The main body 2 is formed of major surfaces 2*a*,2*b*, which respectively correspond to obverse and reverse surfaces, and four end faces 2*c*,2*d*,2*e*,2*f*, which respectively correspond to top, bottom, left side and right side surfaces of the main body 2 and are continuous with the major surfaces 2*a*,2*b*. The main body 2 is shaped into a rectangular plate with a high modulus of rigidity so as to prevent a specified vibration from being transmitted from the driving side arms 3 to the detecting side arms 4. In this case, the specified vibration means such a tangential vibration that the driving side arms 3 vibrate in a plane running in parallel with the major surfaces 2*a*,2*b*.

The driving side arms 3 are composed of two excitation driving side arms 3*a*, 3*b* excited in an opposite phase and a nonexcitation driving side arm 3*c*. These driving side arms 3*a*,3*b*,3*c* are projected vertically from the top surface 2C of the main body 2 so as to lie on extensions of the major surfaces 2*a*,2*b*. The driving side arms 3*a*,3*b*,3*c* run in parallel with each other at a predetermined interval, and all the thicknesses thereof are equal to that of the main body 2. Moreover, cross-sections of the driving side arms 3*a*,3*b*,3*c* are almost square shaped.

The detecting side arms 4 are composed of two vibration detecting side arms 4*a*,4*b* vibrating in an opposite phase and a nonvibration detecting side arm 4*c* inserted between the vibration detecting side arms 4*a*,4*b*. These driving side arms 4*a*,4*b*,4*c* are projected vertically from the bottom surface 2*d* of the main body 2 so as to lie on extensions of the major surfaces 2*a*,2*b*. The detecting side arms 4*a*,4*b*,4*c* run in parallel with each other at a predetermined interval, and all the thicknesses thereof are equal to that of the main body 2. Moreover, cross-sections of the detecting side arms 4*a*,4*b*,4*c* are almost square shaped. Central axes of the detecting side arms 4*a*,4*b*,4*c* respectively coincide with those of the driving side arms 3*a*,3*b*,3*c*.

Next, arrangements of electrodes and electrical connections therebetween in the piezoelectric vibration gyroscope according to the invention will be explained referring to FIGS. 3A,3B,3C,4,5.

Figure 3A:
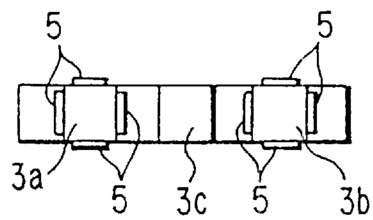
FIGS. 3A, 3B, 3C are respectively a top view, a front view and a bottom view for showing an arrangement of electrodes of a piezoelectric vibration gyroscope according to the first preferred embodiment of the invention.
Figure 3B:
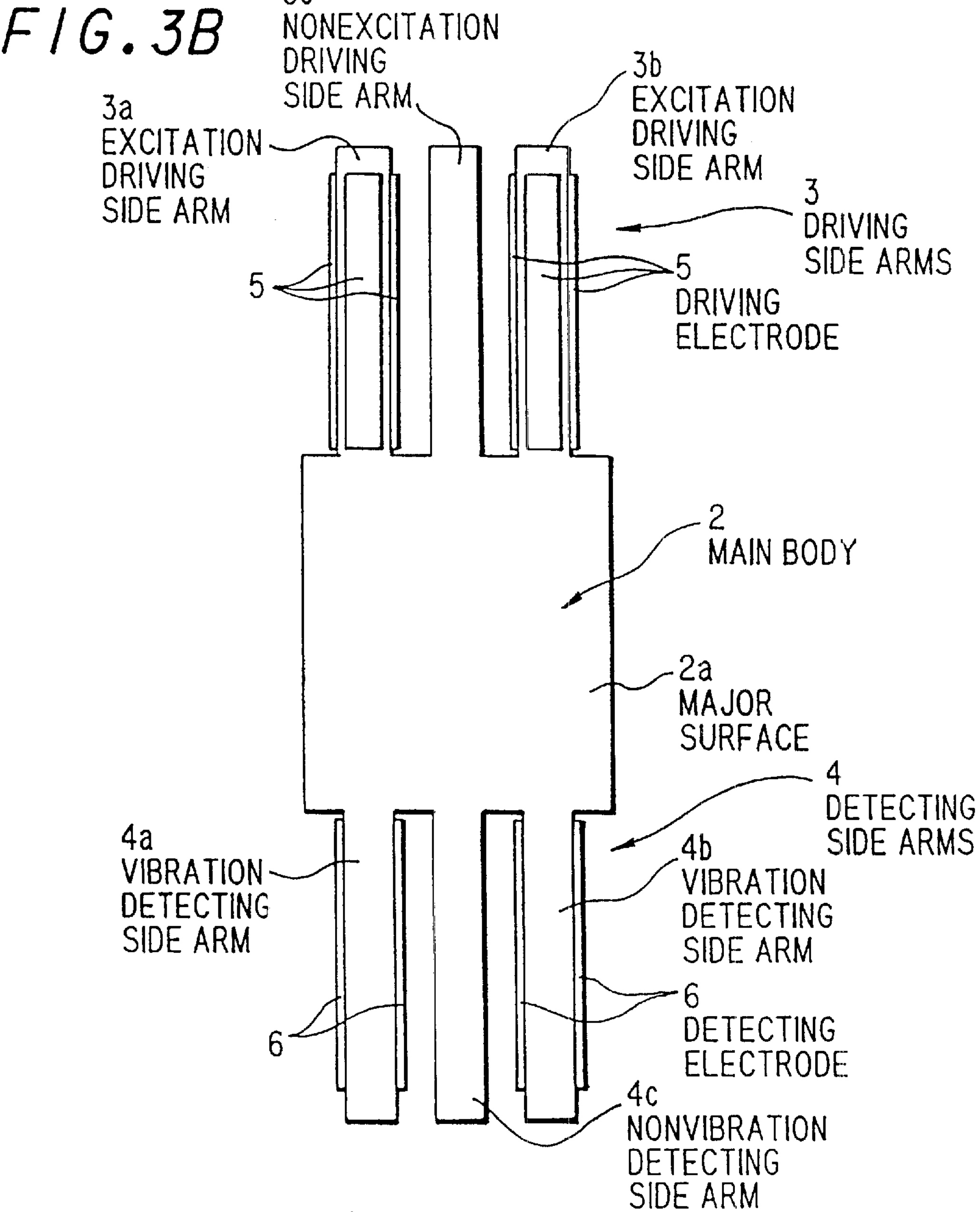
Figure 3C:
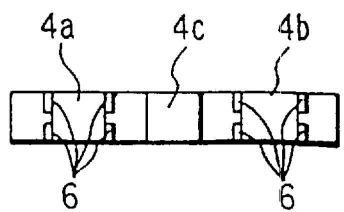
Figure 4:
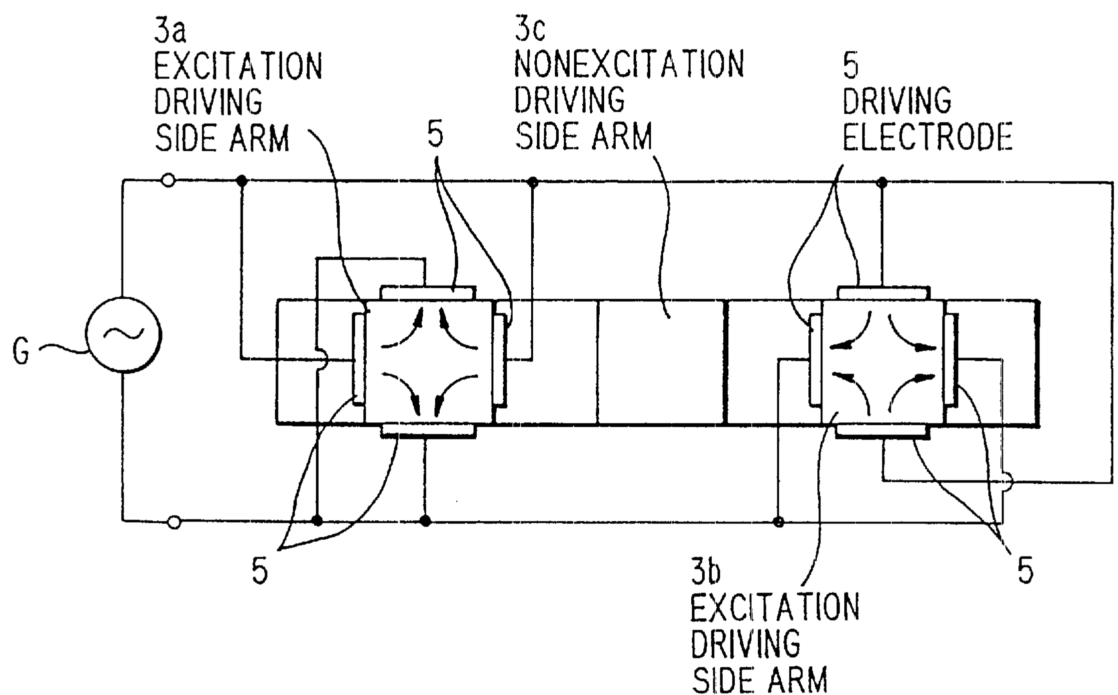
FIG. 4 is a circuit diagram for showing electrical connections of driving electrodes in a piezoelectric vibration gyroscope according to the first preferred embodiment of the invention.
Figure 5:
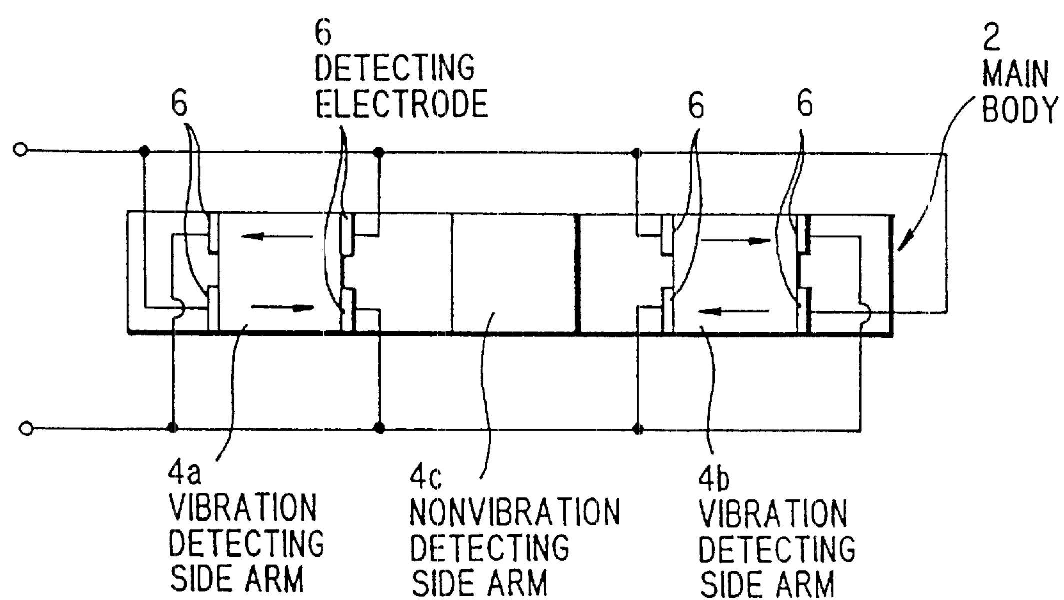
FIG. 5 is a circuit diagram for showing electrical connections of detecting electrodes in a piezoelectric vibration gyroscope according to the first preferred embodiment of the invention.

FIGS. 3A,3B,3C respectively show a top view, a front view and a bottom view for showing the arrangement of the electrodes in the piezoelectric vibration gyroscope according to the first preferred embodiment of the invention. FIG. 4 is a circuit diagram for showing the electrical connections of the driving electrodes of the piezoelectric vibration gyroscope according to the first preferred embodiment of the invention. FIG. 5 is a circuit diagram for showing the electrical connections of the detecting electrodes in the piezoelectric vibration gyroscope according to the first preferred embodiment of the invention.

As shown in FIGS. 3A,3B,3C, each of the excitation driving side arms 3*a*,3*b* are provided with four driving electrodes 5 for exciting the tangential vibration, in which a vibration vector is parallel with the major surface 2*a* of the main body 2. On the other hand, each of the vibration detecting side arms 4*a*,4*b*, is provided with four detecting electrodes 5 for detecting a vertical vibration, in which a vibration vector is vertical to the major surface 2*a* of the main body 2.

Each driving electrode 5 is formed of a rectangular metallic sheet with uniformed dimensions, and extends from a starting end of each of the excitation driving side arms 3*a*,3*b* to a terminal end thereof. Each of a front surface, a rear surface, a left side surface and a right side surface (vertical surfaces, hereinafter at need) of each of the excitation driving side arms 3*a*,3*b* is provided with the driving electrode 5 which runs along a center line of the vertical surface. The front and rear surfaces are parallel with the major surface 2*a* of the main body 2, and the left and right side surfaces are vertical to the same.

As shown in FIG. 4, the respective driving electrodes 5 are so connected with an AC power supply G that the driving electrodes 5 situated opposite to each other are supplied with a voltage of the same polarity and the driving electrodes 5 situated adjacently are supplied with the voltages of opposite polarities.

Phases of the currents supplied to the driving electrodes 5 of the excitation driving side arm 3*a* are opposite to those of the excitation driving side arm 3*b*.

Each of the detecting electrodes 6 is formed of a rectangular metallic sheet with uniformed dimensions. The detecting electrodes 6 are situated on the left and right side surfaces of the vibration detecting side arms 4*a*,4*b*. The detecting electrodes 6 on the same side surface are formed from a pair of strip shaped electrodes running along both side edges of the vertical surface, and extends from the starting end of the vibration detecting side arm 4*a* or 4*b* to a terminal end thereof.

As shown in FIG. 5, the respective detecting electrodes are so connected with a detecting device (not shown) that the detecting electrodes 6 situated on the same diagonals of the cross-sections of the vibration detecting side arms 4*a*, 4*b* are in the same polarity, the detecting electrodes 6 situated opposite to each other are in the opposite polarity, and the detecting electrodes 6 on the same side surface are in the opposite polarity.

Moreover, the detecting electrodes 6 on the vibration detecting side arm 4*a* and the detecting electrodes 6 on the vibration detecting side arm 4*b* are so connected with the detecting device that the polarity of the former is opposite to that of the latter.

Next, the operation of the piezoelectric vibration gyroscope according to this embodiment at the time of detection of an angular velocity will be explained referring to FIGS. 4 to 7.

If an AC voltage is impressed upon the driving electrodes 5, electric fields shown by arrows in FIG. 4 are generated in the excitation driving side arms 3*a*,3*b*, and thereby mechanical stresses are caused. Accordingly, the excitation driving side arms 3*a*,3*b* are displaced in the direction parallel with the major surface 2*a* of the main body 2, and vibrate in the left and right directions.

In this case, the electric fields having the opposite directions are respectively generated in the excitation driving side arms 3*a*,3*b*, at all times in accordance with a difference in the electrical connection between the arms 3*a*,3*b* shown in FIG. 4, and the mechanical displacements in the opposite directions are caused in these arms. As a result, the tangential vibrations (the vibrations in parallel with the major surface 2*a*) having a phase difference of $\pi$ are respectively excited in the excitation driving side arms 3*a*,3*b* as represented by two dot chain lines in FIG. 6. The aforementioned tangential vibration is one of driving modes in the piezoelectric vibration gyroscope using a double trident tuning fork according to this embodiment.

Figure 6:
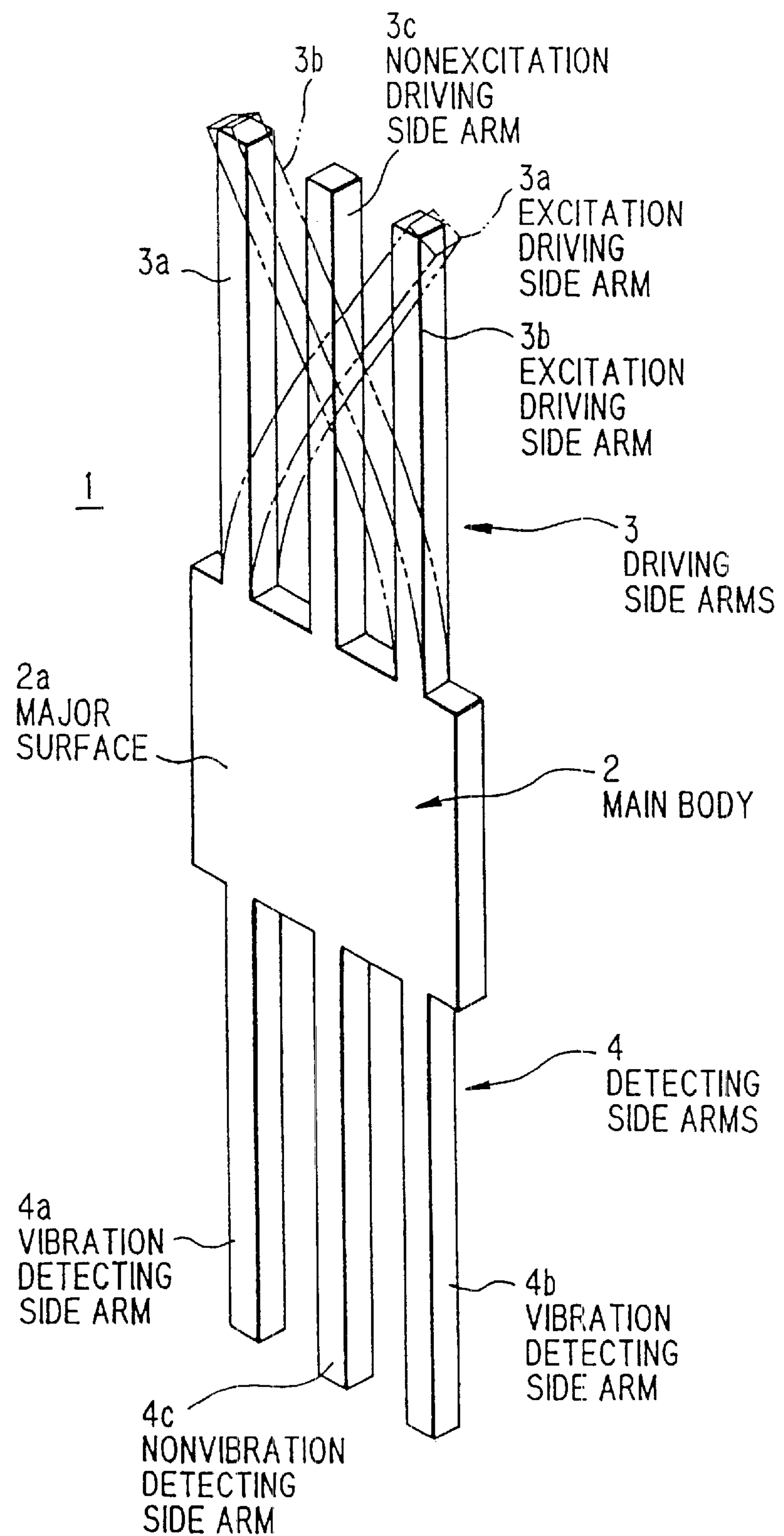
FIG. 6 is a perspective view for showing displacements of arms in a vibration of a driving mode in a piezoelectric vibration gyroscope according to the first preferred embodiment of the invention.

Although the extremely large displacements of the excitation driving side arms 3*a*,3*b* are shown in FIG. 6 for better understanding, the actual displacement of each of excitation driving side arms 3*a*,3*b* is limited within a range that it is not brought into contact with a neighboring arm.

In case that the tangential vibration is excited in the excitation driving side arms 3*a*,3*b* and the piezoelectric vibration gyroscope 1 is set on a rotating object which is rotating at an angular velocity of Ω around the direction of projections of the driving side arms 3*a*,3*b*,3*c* (y axis shown in FIG. 2), Coriolis force exerts on the excitation driving side arms 3*a*,3*b* vertically to the major surface 2*a* of the main body 2. As a result, two vertical vibrations with opposite phases which vibrate vertically to the major surface 2*a* of the main body 2 are respectively excited in the excitation driving side arms 3*a*,3*b* responding to the tangential vibration as represented by two dot chain lines in FIG. 7.

In this case, the vertical vibration in the excitation driving side arms 3*a*,3*b* is transmitted to the vibration detecting side arms 4*a*,4*b* via the main body 2. Similarly to the tangential vibration in the excitation driving side arms 3*a*,3*b*, the two vertical vibrations with the opposite phases which vibrate vertically to the major surface 2*a* of the main body 2 are respectively excited in the vibration detecting side arms 4*a*,4*b*. The aforementioned vertical vibration is one of detecting modes in the piezoelectric vibration gyroscope using a double trident tuning fork according to this embodiment.

Figure 7:
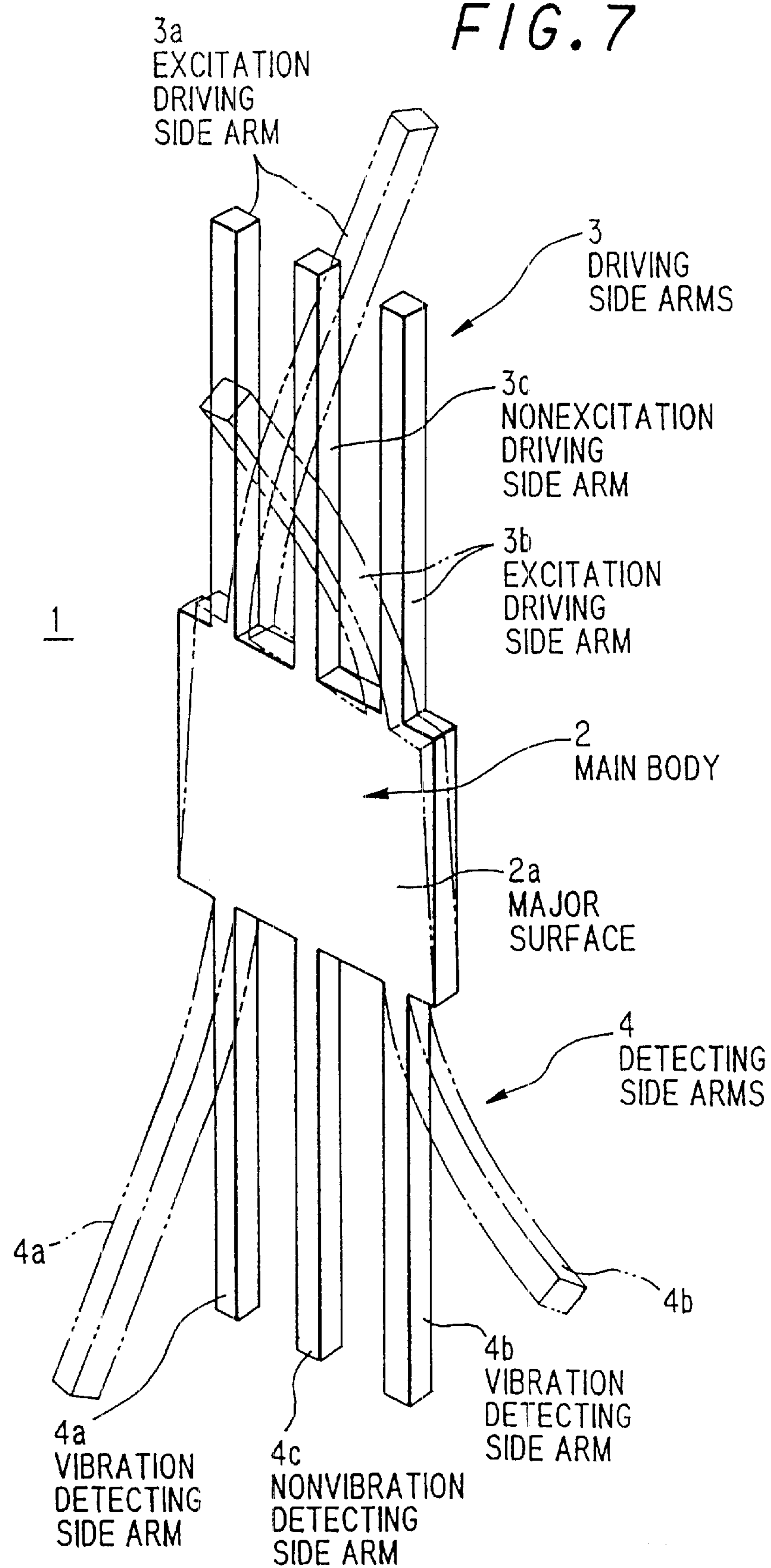
FIG. 7 is a perspective view for showing displacements of arms in a vibration of a detecting mode in a piezoelectric vibration gyroscope according to the first preferred embodiment of the invention.

In this case, the displacements of the vertical vibration of the vibration detecting side arms 4*a*,4*b* are several times as large as the displacements of the vertical vibration of the excitation driving side arms 3*a*,3*b* as shown in FIG. 7.

Since the modulus of rigidity of the main body 2 is high in the major surface thereof, the tangential vibration of the excitation driving side arms 3*a*,3*b* is hardly transmitted to the detecting side arms 4*a*,4*b*,4*c*, and the tangential vibration of the detecting side arms 4*a*,4*b*,4*c* is hardly excited.

The electric fields represented by arrows shown in FIG. 5 are generated by electric charge which is caused by the displacements of the vertical vibration of the vibration detecting side arms 4*a*,4*b*, and a potential difference is generated between the detecting electrodes 6. The angular velocity Ω of the rotating object around y axis can be elected by measuring the aforementioned potential difference.

FIGS. 6, 7 shows the vibration modes of the piezoelectric vibration gyroscope 1 using a double trident tuning fork analyzed by the finite element method. The inventers confirm that a distribution of the displacement caused by the vibration shown in FIGS. 6, 7 agree with the observed results of the experiment, in which the piezoelectric vibration gyroscope using a double trident tuning fork is vibrating and the displacement caused by the vibration is measured by means of a laser Doppler vibrometer.

Next, an outline of a method for fabricating the piezoelectric vibration gyroscope 1 using a double trident tuning fork will be explained. A basic plate of the gyroscope 1 shown in FIG. 2 is cut out from a Z cut langasite plate by the method of wire-cutting. The driving electrodes 5 and the detecting electrodes 6 shown in FIGS. 3A,3B,3C are formed as Au/Cr evaporated electrodes by the methods of evaporation and photoresist.

In this embodiment, it is desirable to make the whole structure of the piezoelectric vibration gyroscope be symmetrical with respect to both the horizontal and vertical axes thereof and the thickness of the main body 2 and those of the arms 3,4 be equal to each other in order to suppress any vibration which is other than the tangential vibration of the driving mode and the vertical vibration of the detecting mode, in other words "a noise". If the whole structure deviates from the aforementioned configuration, spurious response frequencies which are other than the resonance frequencies of the tangential and vertical vibrations occur, and the spurious responses must be coped with.

That is to say, the piezoelectric vibration gyroscope using a double trident tuning fork which is free from the spurious responses and shows a satisfactory frequency response and a rapid rise up characteristic can be obtained by forming this device so as to be symmetrical with respect to both the horizontal and vertical axes thereof. In this embodiment, the length, the width and the thickness of the main body 2 are respectively 4 mm, 4 mm and 0.46 mm, and the length, the width and the thickness of the arms 3,4 are respectively 6 mm, 0.4 mm and 0.46 mm.

In this embodiment, in order to excite the tangential vibration in the exciting driving side arms 3*a*,3*b* with a high efficiency by impressing a voltage upon the driving electrodes 5, it is desirable to increase an effective electromechanical coupling coefficient (Keff) of the driving electrodes 5 as high as possible.

Next, a relation between the effective electrodemechanical coupling coefficient and the size of the driving electrode 5 will be explained referring to FIGS. 8A,8B,9,10.

Figure 8A:
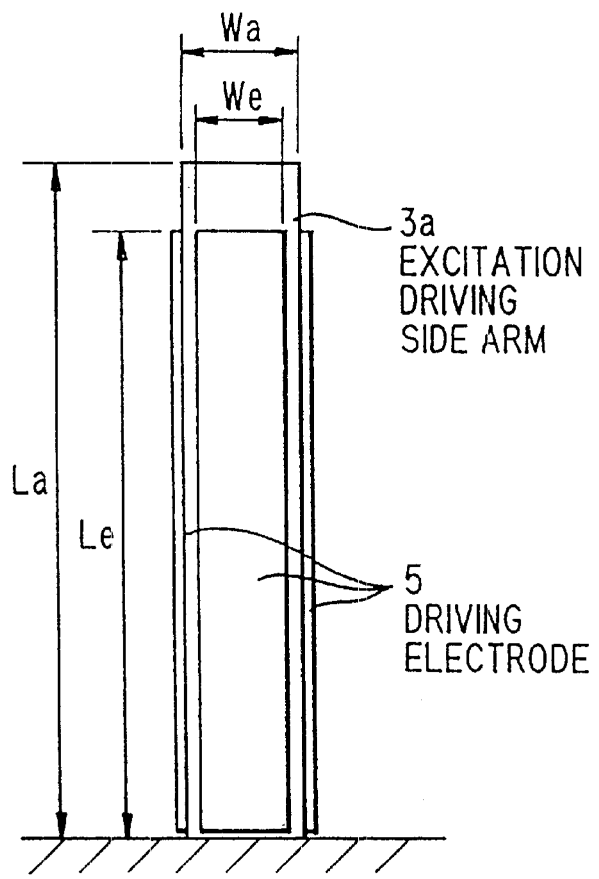
FIGS. 8A, 8B are respectively a front view and a top view for showing excitation driving side arms of a piezoelectric vibration gyroscope according to the first preferred embodiment of the invention.
Figure 8B:
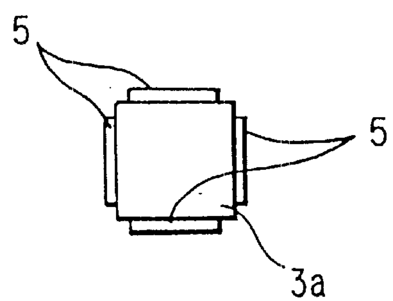
Figure 9:
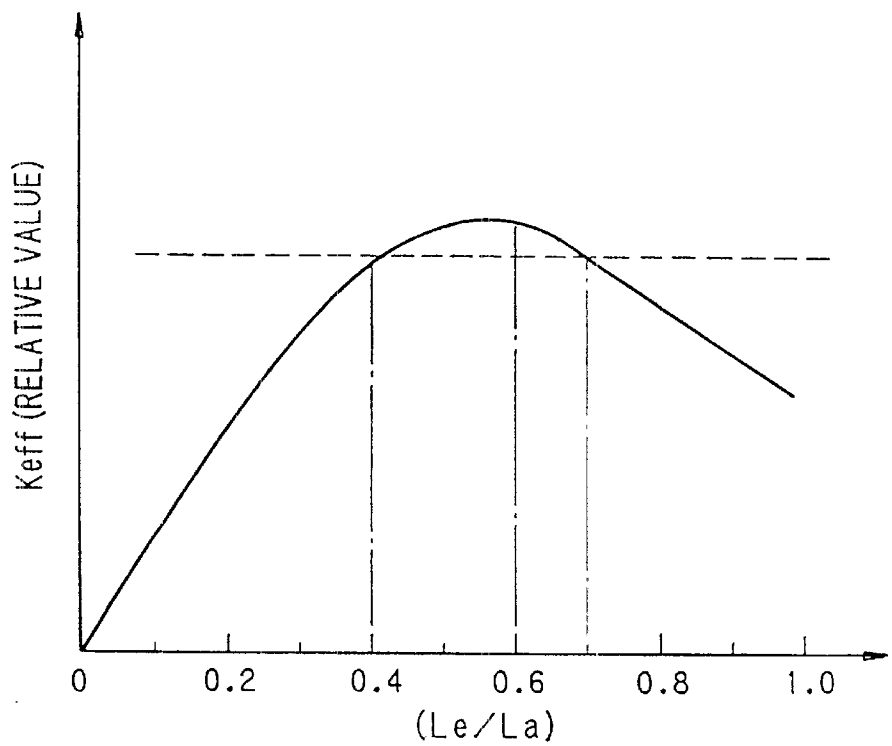
FIG. 9 shows a relation between a length of a driving electrode of an excitation driving side arm and an effective electromechanical coupling coefficient.
Figure 10:
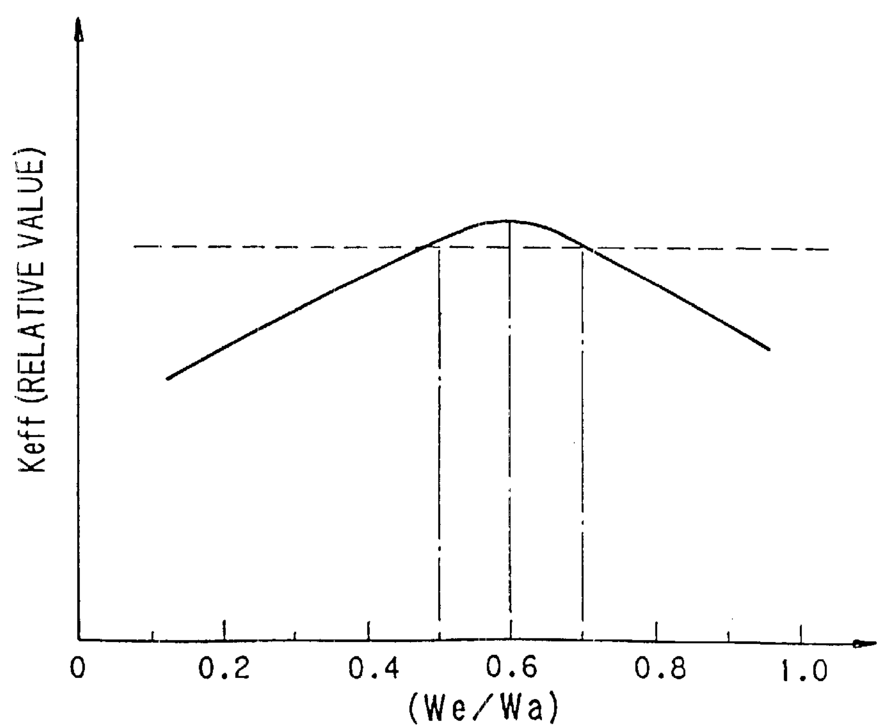
FIG. 10 shows a relation between a width of a driving electrode of an excitation driving side arm and an effective electromechanical coupling coefficient.

FIGS. 8A,8B respectively show a front view and a top view of the excitation driving side arm of the piezoelectric vibration gyroscope according to the first preferred embodiment of the invention. FIG. 9 shows a relation between a length of the driving electrode of the excitation driving side arm shown in FIGS. 8A,8B and the effective electromechanical coupling coefficient. FIG. 10 shows a relation between the width of the driving electrode of the excitation driving side arm shown in FIGS. 8A,8B and the effective electromechanical coupling coefficient.

In the piezoelectric vibration gyroscope 1 using a double trident tuning fork, since stiffness of the main body 2 is sufficiently higher than that of the driving side arms 3*a*,3*b*,3*c*, it is reasonable to assume that the excitation driving side arm 3*a* can be regarded as a cantilever as shown in FIGS. 8A,8B.

Accordingly, the effective electromechanical coupling coefficient is calculated as a function of the dimensions of the driving electrode 5 on the basis of an assumption that the excitation driving side arm 3*a* can be regarded as the cantilever.

First, maintaining the ratio of the width We of the driving electrode 6 to the width Wa of the excitation driving side arm 3*a* (We/Wa) at 0.7, the ratio of the length Le of the excitation driving side arm 3*a* to the length La of the excitation driving side arm 3*a* (Le/La) is varied from 0 to 1. In this case, the elective electromechanical coupling coefficient (a relative value) is shown as a function of Le/La in FIG. 9.

As seen from in FIG. 9, the effective electromechanical coupling coefficient becomes high in a region that the ratio Le/La is 0.4 to 0.7.

Next, maintaining the ratio of the length Le of the driving electrode 5 to the length La of the excitation driving side arm 3*a* (Le/La) at 0.6, the relation between the ratio of the width We of the driving electrode 5 to the width Wa of the excitation driving side arm 3*a* (We/Wa) and the effective electromechanical coupling coefficient (a relative value) is calculated as shown in FIG. 10.

As seen from FIG. 10, the effective electromechanical coupling coefficient becomes high in a range that We/Wa is 0.5 to 0.7.

According to the aforementioned results, the high effective electromechanical coupling coefficient can be obtained in case that the length of the driving electrode 5 is 40 to 70 percent of the length of the driving side arms 3*a*,3*b*,3*c* and the width of the driving electrode 5 is 50 to 70 percent of the width of the driving side arms 3*a*,3*b*,3*c*.

Moreover, in order to heighten the sensitivity in the detection of the vertical vibration of the vibration detecting side arm 4*a* in this embodiment, it is desirable to so select the size of the detecting electrode 6 that the effective electromechanical coupling coefficient is made to be as high as possible.

Next, the relation between the size of the detecting electrode 6 and the effective electromechanical coupling coefficient will be explained referring to FIGS. 11A,11B,12, 13.

Figure 11A:
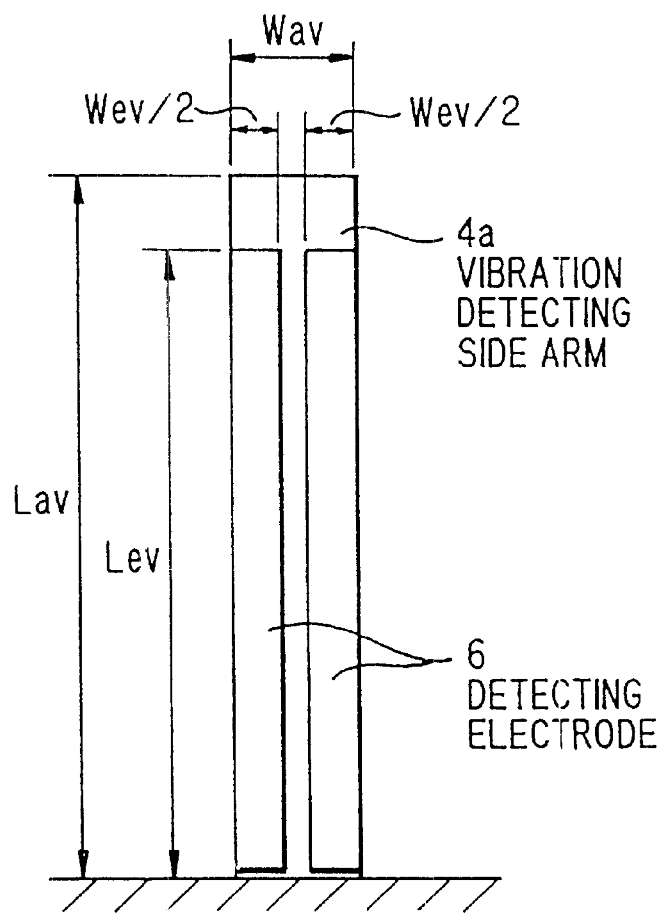
FIGS. 11A, 11B are respectively a front view and a top view of a vibration detecting side arm of a piezoelectric vibration gyroscope according to the first preferred embodiment of the invention.
Figure 11B:
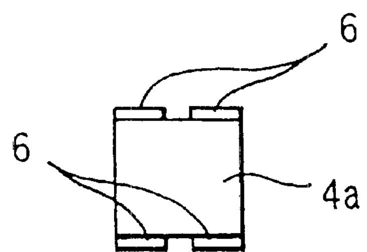
Figure 12:
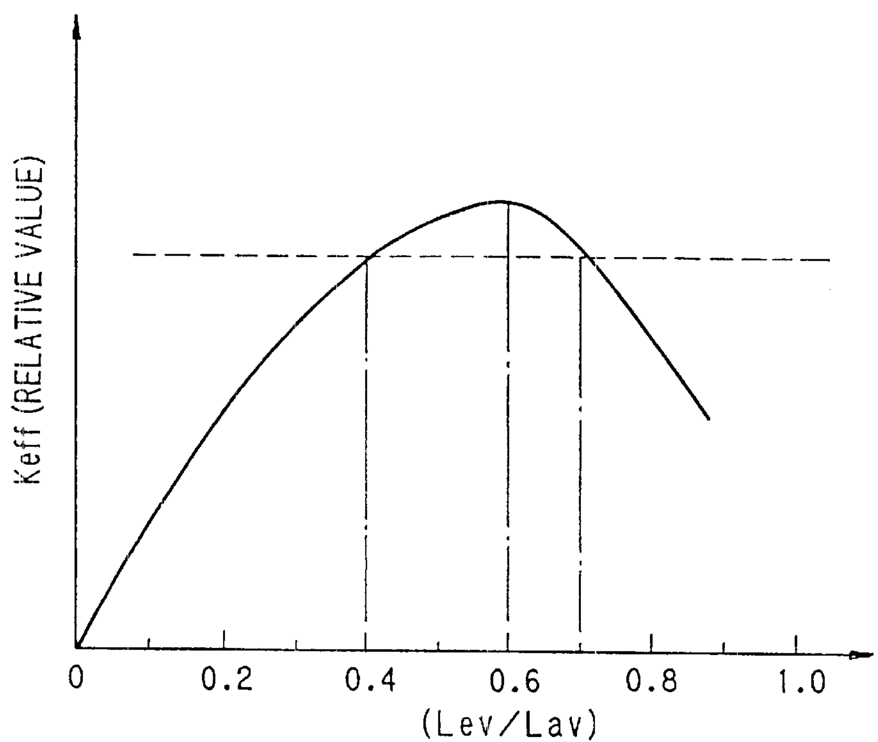
FIG. 12 shows a relation between a length of a detecting electrode of a vibration detecting side arm shown in FIGS. 11A, 11B and an electromechanical coupling coefficient.
Figure 13:
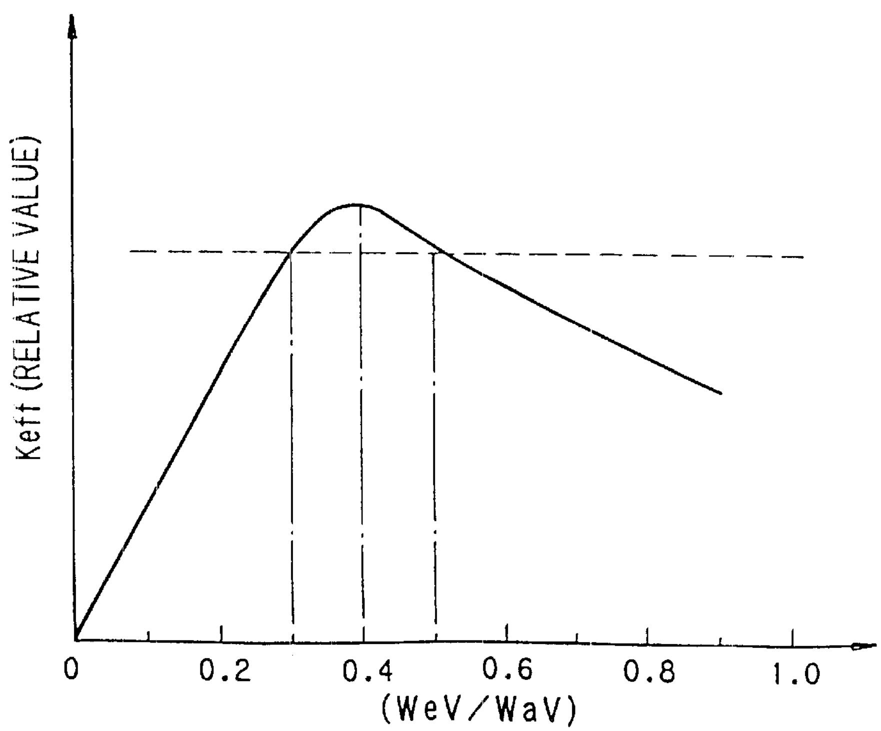
FIG. 13 shows a relation between a width of a detecting electrode of a vibration detecting side arm shown in FIGS. 11A, 11B and an effective electromechanical coupling coefficient.

FIGS. 11A,11B respectively show the front and top views of the piezoelectric vibration gyroscope according to the first preferred embodiment of the invention. FIG. 12 shows the relation between the length of the detecting electrode of the vibration detecting side arm shown in FIGS. 11A, 11B and the effective electromechanical coupling coefficient. FIG. 13 shows the relation between the width of the detecting electrode of the vibration detecting side arm shown in FIGS. 11A,11B and the effective electromechanical coupling coefficient.

Since the stiffness of the main body 2 of the piezoelectric vibration gyroscope 1 using a double trident tuning fork is far higher that that of the detecting side arms 4*a*,4*b*,4*c*, it is reasonable to assume that the vibration detecting side arm 4*a* can be regarded as a cantilever as shown in FIGS. 11A,11B.

From this point of view, the effective electromechanical coupling coefficient of the vibration detecting side arm 4*a* is calculated as a function of the size of the detecting electrode 6 on the basis of an assumption that the vibration detecting side arm 4*a* can be regarded as the cantilever.

First, maintaining the ratio of the double width Wev of the detecting electrode 6 (a sum of the widths of the two detecting electrodes 6 formed on the same surface)to the width Wav of the vibration detecting side arm 4*a* (Wev/Wav) at 0.5, the ratio of the length Lev of the detecting electrode 6 to the length Lav of the vibration detecting side arm 4*a* (Lev/Lav) is varied from 0 to 1. FIG. 12 shows a relation between Lev/Lav and the effective electromechanical coupling coefficient in the aforementioned case.

As seen from FIG. 12, the effective electromechanical coupling coefficient takes a high value in a region that Lev/Lav is 0.4 to 0.7.

Next, maintaining the ratio of the length Lev of the detecting electrode 6 to the length Lav of the vibration detecting side arm 4*a* (Lev/Lav) at 0.6, the ratio of the double width Wev of the detecting electrode 6 (the sum of the widths of the two detecting electrode 6 formed on the same surface) to the width Wav of the vibration detecting side arm 4*a* (Wev/Wav) is varied from 0 to 1. FIG. 13 shows the effective electromechanical coupling coefficient as a function of Wev/Wav.

As seen from FIG. 13, the effective electromechanical coupling coefficient takes a high value in a region that Wev/Wav is 0.3 to 0.5.

From the aforementioned considerations, it can be concuded that, when the length of the detecting electrode 6 is 40 to 70 percent of the length of the detecting side arms 4*a*,4*b*,4*c*, and the double width of the detecting electrode 6 is 30 to 50 percent of the width of the detecting side arms 4*a*,4*b*,4*c*, the high effective electromechanical coupling coefficient can be obtained, and the piezoelectric vibration gyroscope 1 having a wide band frequency response and the high sensitivity in the detection can be obtained.

In the piezoelectric vibration gyroscope 1 mentioned in the above, although the sensitivity in the detection is heightened in case that a difference in a resonance frequency between the driving and detecting modes is too small, a transient variation in the angular velocity caused by a noise such as an external vibration becomes noticeable.

Accordingly, in order to obtain the piezoelectric vibration gyroscope 1 having a statisfactory frequency response and the high sensitivity in the detection, it is desirable that there is a difference in a resonance frequency between the driving and detecting modes, in other words an off-tuning. For example, if the piezoelectric vibration gyroscope is installed on an automobile, it is desirable that the difference in the resonance frequency between the tangential vibration (the driving mode) and the vertical vibration (the detecting mode) is about 100 Hz, hence the aforementioned difference in the resonance frequency in this embodiment is selected to be 100 Hz.

In order to meet the aforementioned request, the inventors devise a technology that four corners of the main body 2 are cut by means of a laser as a method for adjusting the difference in the resonance frequency between the driving and detecting modes. According to the aforementioned method, although the resonance frequencies for both the tangential and vertical vibrations are lowered, since lowering of the resonance frequency of the tangential vibration is more noticeable than that of the vertical vibration, the difference in the resonance frequency between the tangential and the vertical vibrations (the driving and detecting modes) can be smoothly adjusted by cutting the four corners of the main body 2.

Figure 14:
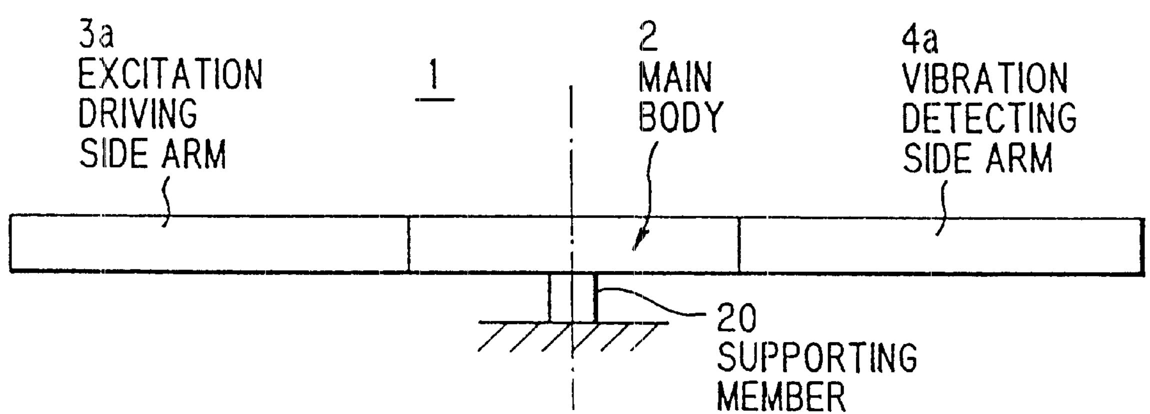
FIG. 14 is a side view for showing a piezoelectric vibration gyroscope according to the first preferred embodiment of the invention which is supported at a center of gravity thereof.

In this embodiment, since the whole structure of the piezoelectric vibration gyroscope 1 is symmetrical with respect to both the horizontal and vertical axes, a displacement of a center of gravity thereof caused by the vibration is less than 0.01 percent of the maximum displacement of the vibration detecting side arm 4*a* or 4*b*, and the piezoelectric vibration gyroscope 1 can be supported at the center of gravity thereof maintaining a high stability as shown in FIG. 14.

FIG. 14 is a side view for showing the piezoelectric vibration gyroscope 1 supported by a supporting member 20 which is fixed to the center of gravity thereof. In this embodiment, the supporting member 20 is formed of quartz glass, and a diameter and a height thereof are both 1 mm.

As mentioned in the above, when the piezoelectric vibration gyroscope 1 using a double trident tuning fork is supported at the center of gravity thereof, the mechanical quality factor of the piezoelectric vibration gyroscope 1 is lowered only by a factor of 0.2, and an increase of loss in the vibration can hardly be observed.

Moreover, in the aforementioned case, a variation of the resonance frequency is less than 3 Hz in both the driving mode (the tangential vibration) and the detecting mode (the vertical vibration).

The inventers support the piezoelectric vibration gyroscope 1 formed of single crystalline langasite as shown in FIG. 14, and detect an angular velocity. They confirm that a high sensitivity in the detection of 0.6 mV/(deg/s) can be obtained.

Turning their attentions to a fact that displacements of the nonexcitation driving side arm 3*c* and the nonvibration detecting side arm 4*c* are extremely small, the inventors provide the first and second supporting members for the piezoelectric vibration gyroscope 1, where the first supporting point is situated on a boundary between the nonexcitation driving arm 3*c* and the main body 2, and the second supporting point is situated on a boundary between the main body 2 and the nonvibration detecting side arm 4C. According to this method, the piezoelectric vibration gyroscope 1 can be supported maintaining a high stability similarly to the method shown in FIG. 14, in which this device is supported at the center of gravity thereof.

As mentioned in the above, in the piezoelectric vibration gyroscope 1 according to the first preferred embodiment of the invention, when the excitation driving side arms 3*a*,3*b* are excited tangentally and symmetrically, the vertical vibration is excited in the excitation driving side arms 3*a*,3*b* because of Coriolis force which is vertical to the major surface 2*a* of the main body 2. The vertical vibration is transmitted to the vibration detecting side arms 4*a*,4*b* via the main body 2, that is to say, the vertical vibration (the vibration of the detecting mode) is excited in the vibration driving side arms 4*a*,4*b*.

In this case, since the vibration of the driving mode (the tangential vibration) is hardly transmitted to the detecting side arms 4*a*,4*b*,4*c*, the vibration of the driving mode is not excited in the detecting side arms 4*a*,4*b*,4*c*, and only the vibration of the detecting mode (the vertical vibrating) is excited therein. Accordingly, since a mechanical coupling between the driving and detecting modes does not occur in the detecting side arms 4*a*,4*b*,4*c*, a satisfactory detection under a high S/N ratio can be conducted in the detecting side arms 4*a*,4*b*,4*c*.

Moreover, since the main body 2 is interposed between the excitation driving side arms 3*a*,3*b* and the vibration detecting side arms 4*a*,4*b* in this embodiment, the driving electrodes 5 are sufficiently remote from the detecting electrodes 6, and thereby an electrostatical coupling therebetween is negligible, hence the detection can be conducted under a high S/N ratio.

Moreover, since the structure of the piezoelectric vibration gyroscope 1 using a double trident tuning fork is symmetrical with respect to both the horizontal and vertical axes, the vibration of the center of gravity thereof does not occur dissimilarly to the conventional device used for the same object, hence piezoelectric vibration gyroscope 1 according to the invention can be supported in a highly stabilized condition. In addition to that, since the displacements of the vibration detecting side arms 4*a*, 4*b* are several times as large as those of the excitation driving side arms 3*a*,3*b*, the detection having a high sensitivity can be conducted.

Although the explanations have been given on the device that the angular velocity is detected by means of the detecting electrodes 6 formed on both the vibration detecting side arms 4*a*,4*b* in the above descriptions, the application of the invention is never restricted to the aforementioned structure, and the angular velocity can be detected by forming the detecting electrodes 6 on either of the vibration detecting side arms 4*a*,4*b*.

Next, the second preferred embodiment of the invention will be explained referring to FIG. 15, FIGS. 16A,16B,16C, FIG. 17,FIG. 18.

FIG. 15 is a perspective view for showing a piezoelectric vibration gyroscope according to the second preferred embodiment of the invention.

A piezoelectric vibration gyroscope using a double trident tuning fork denoted by a reference numeral 51 is composed of a main body 52, driving side arms 53 and detecting side arms 54, and symmetrical with respect to both the horizontal and vertical axes. A whole structure of the second preferred embodiment is formed of X cut langasite piezoelectric material.

The main body 52 is composed two major surfaces 52*a*,52*b* corresponding to obverse and reverse surfaces and four end faces 52*c*,52*d*,52*e*,52*f*, which respectively correspond to top, bottom, left side and right side surfaces of the main body 52 and are continuous with the major surfaces 52*a*,52*b*. The main body 52 is shaped into a rectangular plate having a high modulus of rigidity so as to prevent a specified variation from being transmitted from the driving side arms 53 to the detecting side arms 54. In this case, the specific vibration means such a tangential vibration that the driving side arms 53 vibrate in a plane running in parallel with the major surface 52*a*,52*b*.

The driving side arms 53 are composed of two excitation driving side arms 53*a*, 53*b* excited in an opposite phase and a nonexcitation driving side arm 53*c* inserted between the excitation driving side arms 53*a*,53*b*. These driving side arms 53*a*,53*b*, 53*c* are projected vertically from the top surface 52*c* of the main body 52 so as to lie on extensions of the major surfaces 52*a*,52*b*. The driving side arms 53*a*, 53*b*,53*c* run in parallel with each other at a predetermined interval, and all the thicknesses thereof are equal to that of the main body 52. Moreover, cross-sections of the driving side arms 53*a*,53*b*,53*c* are almost square shaped.

The detecting side arms 54 are composed of two vibration detecting side arms 54*a*,54*b* vibrating in an opposite phase and a nonvibration detecting side arm 54*c* inserted between the vibration detecting side arms 54*a*,54*b*. These detecting side arms 54*a*, 54*b*,54*c* are projected vertically form the bottom surface 54*d* of the main body 52 so as to lie on extensions of the major surfaces 52*a*,52*b*. Central axes of the detecting side arms 54*a*,54*b*,54*c* respectively coincide with those of the driving side arms 53*a*,53*b*,53*c*. All the thicknesses of the detecting side arms 54*a*,54*b*, 54*c* are equal to that of the main body 52. Moreover, cross-sections of the driving side arms 54*a*,54*b*,54*c* are almost square shaped.

Next, arrangements of the electrodes and wirings for connecting the electrodes with each other of the piezoelectric vibration gyroscope according to the second preferred embodiments of the invention will be explained referring to FIGS. 16A, 16B, 16C,FIG. 17,FIG. 18.

Figure 16A:
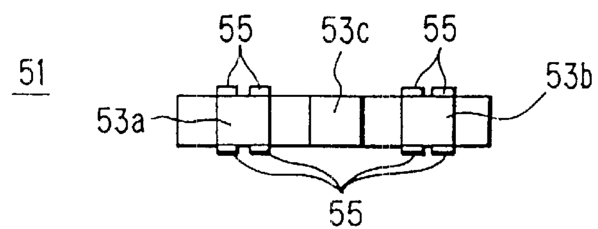
FIGS. 16A, 16B, 16C are respectively a top view, a front view and a bottom view of a piezoelectric vibration gyroscope according to the second preferred embodiment of the invention for showing an arrangement of electrodes.
Figure 16B:
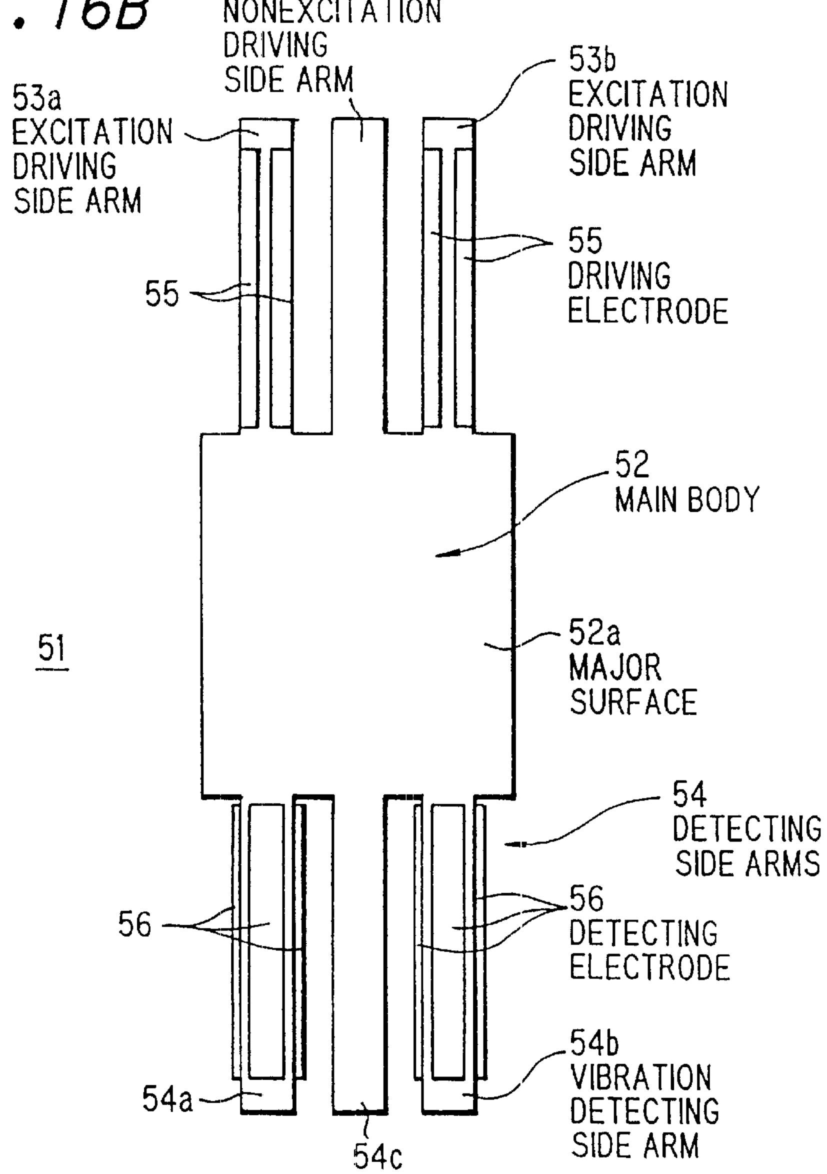
Figure 16C:
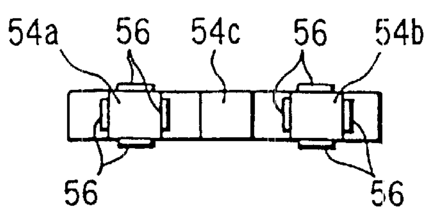
Figure 17:
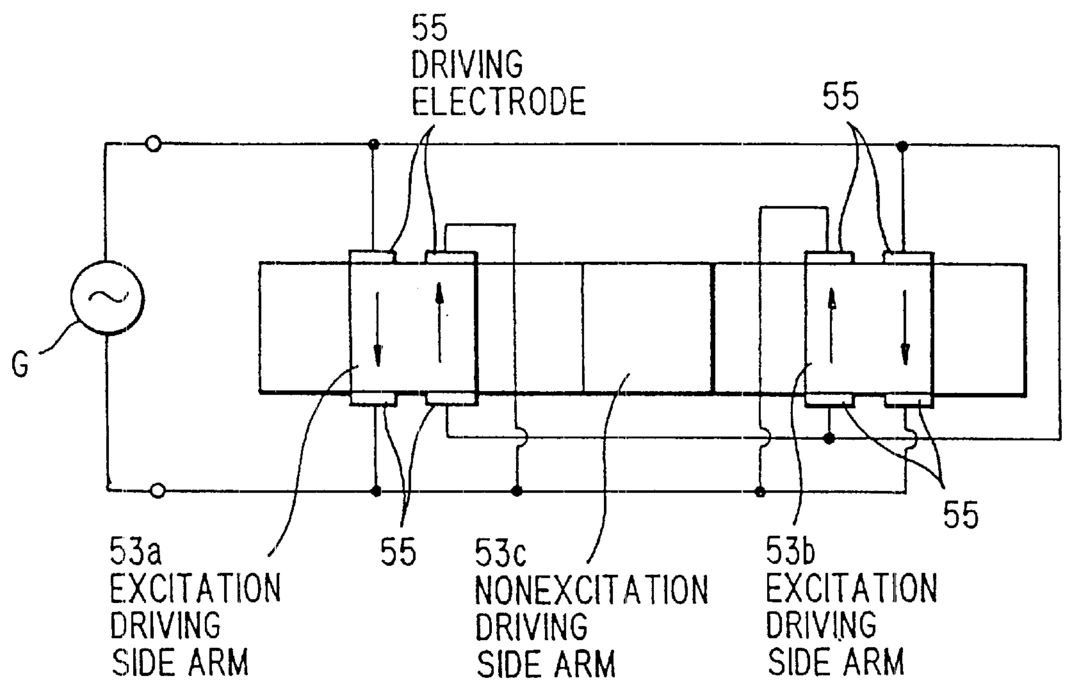
FIG. 17 is a circuit diagram for showing electrical connections of driving electrodes of a piezoelectric vibration gyroscope according to the second preferred embodiment of the invention.
Figure 18:
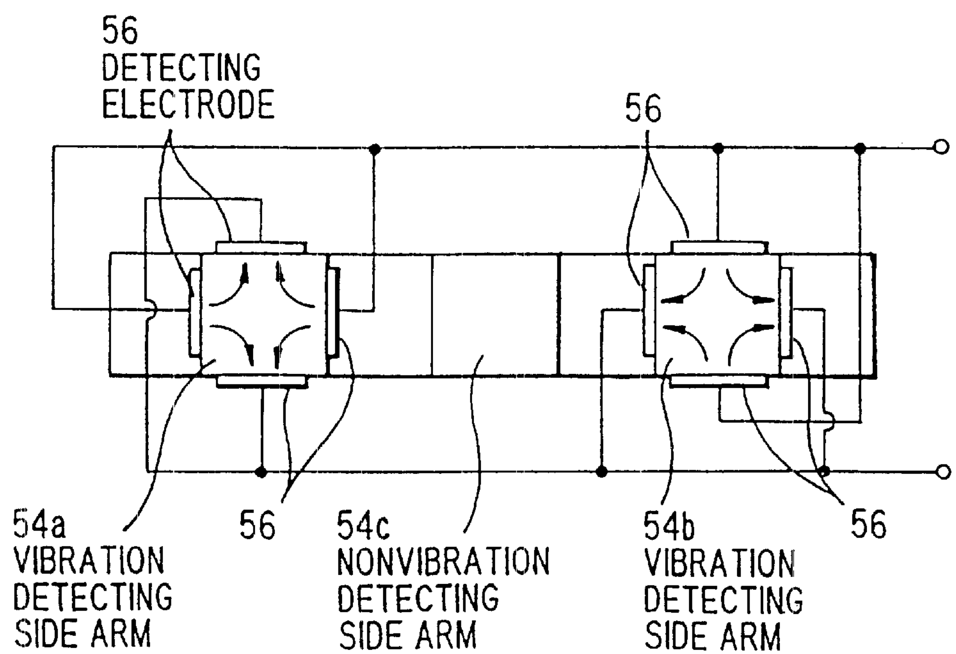
FIG. 18 is a circuit diagram for showing electrical connections of detecting electrodes of a piezoelectric vibration gyroscope according to the second preferred embodiment of the embodiment.

FIGS. 16A, 16B,16C respectively show a top view, a front view and a bottom view of the piezoelectric vibration gyroscope according to the second preferred embodiment of the invention. FIG. 17 is a circuit diagram for showing electrical connections of the driving electrodes formed on the excitation driving side arms 53*a*,53*b*. FIG. 18 shows a circuit diagram for showing the electrical connections of the detecting electrodes formed on the vibration detecting side arms 54*a*,54*b*.

As shown in FIGS. 16A,16B,16C, each of the excitation driving side arms 53*a*,53*b* is provided with the four driving electrodes 55 so that a tangential vibration vibrating in parallel with the major surfaces 52*a*,52*b* is excited in the excitation driving arms 53*a*,53*b*. On the other hand, each of the vibration detecting side arms 54*a*,54*b* is provided with the four detecting electrodes 56 so that a vertical vibration vibrating vertically to the major surfaces 52*a*,52*b* is detected.

Each of the driving electrodes 55 is formed of a rectangular metallic sheet having predetermined dimensions, and extends from a starting end of the excitation driving side arm

53*a* or 53*b* to a terminal end thereof. A pair of driving electrodes 55 is situated on each of front and rear surfaces of each of the excitation driving side arms 53,53*b* and runs along side edges thereof.

As shown in FIG. 17, the driving electrodes 55 situated on a diagonal are connected with an AC power supply G in the same polarity. The driving electrodes 55 situated opposite to each other are connected with the AC power supply G in the opposite polarity. The driving electrode 55 situated on the same surface are connected with the AC power supply G in the opposite polarity.

Moreover, the driving electrodes 55 of the excitation driving side arm 53*a* and the driving electrodes 55 of the excitation driving side are 53*b* are so connected with the AC power supply G that the excitation driving side arms 53*a,* 53*b* are driven in the opposite phase.

As shown in FIGS. 16*a*,16*b*,16*c,* each of front surface, a rear surface, a left side surface and a right side surface of each of the vibration detecting side arms 54*a*,54*b* is provided with a detecting electrode 56, which is formed of a rectangular metallic sheet having predetermined dimensions, and extends from starting end of the vibration detecting side arm 54*a* or 54*b* to a terminal end thereof running along a center line of a vertical surface such as the front surface etc.

In the above description, the front and rear surfaces are parallel with the major surfaces 52*a*,52*b* of the main body 52, and the left and right surfaces are vertical to the major surfaces 52*a*,52*b*.

Moreover, as shown in FIG. 18, the two detecting electrodes 56 situated opposite to each other are connected with the detecting device (not shown) in the same polarity. On the other hand, the two detecting electrodes 56 adjacent to each other are connected with the detecting device in the opposite polarity.

The detecting electrodes 56 formed on the vibration detecting side arms 54*a*,54*b* are connected with the detecting device in the opposite polarity.

In the piezoelectric vibration gyroscope 51 fabricated in this way, since material thereof is different from that of thepiezoelectric vibration gyroscope 1 according to the first preferred embodiment the electric field for exciting the tangential vibration in the excitation driving side arms 53*a*,53*b* and the electric field generated by the vertical vibration of the vibration detecting side arms 54*a,* 54*b* in the second preferred embodiment are different from those in the first preferred embodiment, hence there are differences in the arrangements of the driving electrodes 55 and the detecting electrodes 56 between the first and second preferred embodiments.

Accordingly, the operation in the detection of the angular velocity by means of the piezoelectric vibration gyroscope 51 according to the second preferred embodiment is nearly the same as that by means of the piezoelectric vibration gyroscope 1 according to the first preferred embodiment except that there are differences in the electric fields of the excitation driving side arms 53*a*,53*b* and the vibration detecting side arms 54*a*,54*b* at the time of operation between the first and second preferred embodiments.

Next, an outline of a method for fabricating the piezoelectric vibration gyroscope 51 according to the second preferred embodiment of the invention will be explained. A basic plate of the piezoelectric vibration gyroscope using a double trident tuning fork shown in FIG. 15 is cut out from a X cut langasite plate by a method of wire-cutting. The driving electrodes 55 and the detecting electrodes 56 shown in FIGS. 16A, 16B, 16C are formed as Au/Cr evaporated electrodes by the methods of evaporation and photoresist.

In order to obtain the piezoelectric vibration gyroscope 51 according to the second preferred embodiment which is free from a spurious response and shows a satisfactory frequency response and a rapid rise up characteristic, it is desirable that this device is symmetrical with respect to both the horizontal and vertical axes and the thickness of the main body 2 is the same as those of the arms 53,54 similarly to the first preferred embodiment. The length, the width and the thickness of the main body 52 of the second preferred embodiment 51 are respectively 3 mm,3 mm and 0.34 mm, and the length, the width and the thickness of the arms 53,54 are respectively 4.2 mm,0.3 mm and 0.34 mm.

In order to excite the tangential vibration in the excitation driving side arms 53*a,*53*b* with a high efficiency by impressing a voltage upon the driving electrodes 55 in the second preferred embodiment, the effective electromechanical coupling coefficient is surveyed as functions of external dimensions (a length and a width) of the driving electrode 55 on the basis of an assumption that the excitation driving side arms 53*a,* 53*b* can be regarded as cantilevers.

As a result, the high effective electromechanical coupling coefficient can be obtained in case that the length of the driving electrode 55 is 40 to 70 percent of that of the driving side arm and the double width of the driving electrode 55 (the sum of the widths of the two driving electrodes 55) is 30 to 50 percent of the width of the driving side arm similarly to the results shown in FIGS. 12,13.

Similarly to the above mentioned consideration, the relation between the effective electromechanical coupling coefficient and the size of the detecting electrode is analysed on the basis of an assumption that the vibration detecting side arms 54*a*,54*b* can be regarded as the cantilevers, and the size of the detecting electrode 56 which maximizes the sensitivity in the detection is preassumed.

As a result, it can be confirmed that the effective electromechanical coupling coefficient becomes high in case that the length of the detecting electrode 56 is 40 to 70 percent of the length of the detecting side arm 54 and the width of the detecting electrode 56 is 50 to 70 percent of the width of the detecting side arm 54 similarly to the results shown in FIGS. 9,10.

In addition to that, in order to obtain the piezoelectric vibration gyroscope having a statisfactory frequency response and a high sensitivity in the detection, it is indispensable that there is a difference in the resonance frequency between the driving and detecting modes (an off-tuning) similarly to the first preferred embodiment. In this case, the adjustment of the resonance frequencies can be performed in a similar way to that in the first preferred embodiment. In the second preferred embodiment, the difference in the resonance frequency between the driving mode (the same as the driving mode shown in FIG. 6) and the detecting mode (the same as the detecting mode shown in FIG. 7) is 90 Hz.

In the second preferred embodiment, since the whole structure of the piezoelectric vibration gyroscope 51 is symmetrical with respect to both the horizontal and vertical axes, the displacement of the center of gravity is less than 0.01 percent of the maximum displacements of the excitation driving side arms 53*a,*53*b* or the vibration detecting side arms 54*a,*54*b,* and the piezoelectric vibration gyroscope 51 can be supported at the center of gravity thereof maintaining a high stability similarly to the first preferred embodiment. In the second preferred embodiment, the supporting member 20 shown FIG. 14 is formed of polymide resin.

As mentioned in the above, when the piezoelectric vibration gyroscope using a double trident tuning fork 51 is supported at the center of gravity thereof, the mechanical quality factors of this device is lowered only by a factor of less than 0.3, and an increase in loss of the vibration is hardly observed.

Moreover, the difference in the resonance frequency of the driving mode (the tangential vibration) or the detecting mode (the vertical vibration) between the nonsupported and supported piezoelectric vibration gyroscope is less than 5 Hz.

The piezoelectric vibration gyroscope 51 formed of single crystalline langasite is supported by the method shown in FIG. 14, and thereby an angular velocity is detected. The inventors confirm that a high sensitivity in the detection of 0.7 mV(deg/s) can be obtained.

Tuning their attentions to the fact that the displacements in the vibration of the nonexcitation driving side arm 53C and the nonvibration detecting side arm 54C are extremely small in the piezoelectric vibration gyroscope 51 according to the second preferred embodiment, the inverters provide the first and second supporting members for the piezoelectric vibration gyroscope 51, where the first supporting member is situated on the first boundary between the nonexcitation driving side arm 53*c* and the main body 52, and the second supporting member is situated on the second boundary between the main body 52 and the nonvibration detecting side arm 54*c*. According to the aforementioned method, the piezoelectric vibration gyroscope 51 can be supported maintaining a high stability similarly to the method shown in FIG. 14, in which this device is supported at the center of gravity thereof.

As mentioned in the above, in the piezoelectric vibration gyroscope 51 according to the second preferred embodiment, since only the detecting mode is excited in the vibration detecting side arms 54*a*,54*b* similarly to the first preferred embodiment, a vibration mode obstructing the function of the device is hardly excited. Moreover, since the vibration detecting side arms 54*a*,54*b*, are sufficiently remote from the excitation driving side arm 53*a*,53*b*, an electrostatical coupling therebetween is negligible, and the detection under a high S/N ratio can be conducted.

Since the piezoelectric gyroscope according to the second preferred embodiment is symmetrical with respect to both the horizontal and vertical axes, the vibration of the center of gravity thereof does not occur dissimilarly to the conventional device, hence the piezoelectric vibration gyroscope 51 can be supported maintaining a high stability.

In addition to that, since the displacements of the vibration of the vibration detecting side arms 54*a*,54*b* are several times as large as those of the excitation driving side arms 53*a*,53*b*, a high sensitivity in the detection can be achieved.

Although the detecting electrodes 56 are provided for both the vibration detecting side arms 54*a*,54*b* in the second preferred embodiment in order detect the angular velocity, the same purpose can be attained by the structure in which the detecting electrodes 56 are provided for either of the vibration detecting side arms 54*a*,54*b*.

Although the piezoelectric vibration gyroscope formed of Z cut langasite or X cut langasite has been explained in the above descriptions, the application of the invention is never restricted to the aforementioned examples, and the similar effect can be achieved by the piezoelectric vibration gyroscope formed of X cut quartz, Z cut quartz,130° rotated Y plate lithium tantalite or piezoelectric ceramics uniformly polarized in the thickness direction.

As mentioned in the above, according to the invention, since the angular velocity can be detected under a high S/N ratio, the angular velocity can be detected with high resolution, and the angular velocity less than that of the rotation of the earth can be detected.

Since the whole structure of the piezoelectric vibration gyroscope is symmetrical with respect to both the horizontal and vertical axes, this device can be supported at the center of gravity thereof maintaining a high stability.

Since the electromechanical coupling coefficient between a drive in the excitation driving side arms and a detection in the vibration detecting side arms can be heightened by optimizing the dimensions of the electrodes and the displacements of the vibration detecting side arms are several times as large as those of the excitation driving side arms, the angular velocity can be detected with high sensitivity.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A piezoelectric vibration gyroscope, comprising:

a main body shaped into a rectangular plate and provided with obverse and reverse surfaces functioning as major surfaces, and first and second groups of three arms projecting from said main body in opposite directions and lying on extensions of said major surfaces, wherein said main body and said first and second groups of said three arms are formed of piezoelectric material, said first group of said three arms is composed of two excitation driving side arms excited in an opposite phase and a nonexcitation driving side arm inserted between said two excitation driving side arms, said second group of said three arms is composed of two vibration detecting side arms vibrating in an opposite phase and a nonvibration detecting side arm inserted between said two vibration detecting side arms, said two excitation driving side arms are respectively provided with driving electrodes for exciting a tangential vibration vibrating in parallel with said major surfaces, and said two vibration driving side arms are respectively provided with detecting electrodes for detecting a vertical vibration vibrating vertically to said major surfaces.

2. A piezoelectric vibration gyroscope according to claim 1, wherein:

said main body is shaped into said rectangular plate so that a transmission of said tangential vibration from said excitation driving side arms to said vibration detecting side arms can be suppressed.

3. A piezoelectric vibration gyroscope according to claim 1, wherein;

said main body and said first and second groups of said three arms are formed into one united body.

4. A piezoelectric vibration gyroscope according to claim 1, wherein;

said excitation and nonexcitation driving side arms and said vibration and nonvibration detecting side arms are formed either of Z cut quartz or a Z cut langasite, and have a rectangular shaped cross-section, at least one of front, rear, right side and left side vertical surfaces of each of said excitation driving side arms is provided with said driving electrode, which extends from a neighborhood of a starting end of said excitation driving side arm towards a terminal end thereof running along a center line of respective of said at least one of said front, rear, right side and left side vertical surfaces of each of said excitation driving side arms and maintaining predetermined dimensions, and at least one of right and left side vertical surfaces of each of said vibration detecting side arms is provided with a pair of strip shaped detecting electrodes having same dimensions, which extends from a neighborhood of a starting end of said vibration detecting side arm towards a terminal end thereof running along at least one side edge of said at least one of said left and right side vertical surfaces of each of said vibration detecting side arms and maintaining predetermined dimensions.

5. A piezoelectric vibration gyroscope according to claim 4, wherein:

a length of said driving electrode is forty to seventy percent of that of said excitation driving side arm, a width of said driving electrode is fifty to seventy percent of that of said excitation driving side arm, a length of said detecting electrode is forty to seventy percent of that of said vibration detecting side arm, and double width of said detecting electrode is thirty to fifty percent of a width of said vibration detecting side arm.

6. A piezoelectric vibration gyroscope according to claim 1, wherein:

said excitation and nonexcitation driving side arms and said vibration and nonvibration detecting side arms are formed of material of one kind selected from X cut quartz, X cut langasite, and 130 rotated Y plate lithium tantalate, and have a rectangular shaped cross-section, at least one of front and rear surfaces of each of said excitation driving side arms is provided with a pair of strip shaped driving electrodes having same dimensions, which extends from a neighborhood of a starting end of said excitation driving side arm towards a terminal end thereof running along at least one side edge of said at least one of front and rear vertical surfaces of each of said excitation driving side arms and maintaining predetermined dimensions, and at least one of front, rear, right side, and left side vertical surfaces of each of said vibration detecting side arms is provided with a detecting electrode, which extends from a neighborhood of a starting end of said vibration detecting side arm towards terminal end thereof running along a center line of respective of said at least one of said front, rear, right side and left side vertical surfaces of each of said vibration detecting side arms and maintaining predetermined dimensions.

7. A piezoelectric vibration gyroscope according to claim 6, wherein:

a length of said driving electrode is forty to seventy percent of that of said excitation driving side arm, double width of said driving electrode is thirty to fifty percent of a width of said excitation driving side arm, a length of said detecting electrode is forty to seventy percent of that of said vibration detecting side arm, and a width of said detecting electrode is fifty to seventy percent of that of said vibration detecting side arm.

8. A piezoelectric vibration gyroscope according to claim 1, wherein:

said gyroscope is constructed so as to be symmetrical with respect to both horizontal and vertical axes thereof, and a thickness of said main body is a same thickness as a thickness of said excitation detecting side arms.

9. A piezoelectric vibration gyroscope according to claim 1, wherein:

said piezoelectric vibration gyroscope is provided with first and second supporting members, wherein:

said first supporting member is situated on a first boundary between said nonexcitation driving side arm and said main body, and said second supporting member is situated on a second boundary between said main body and said nonvibration detecting side arm.

10. A piezoelectric vibration gyroscope according to claim 1, wherein:

said piezoelectric vibration gyroscope is provided with a supporting member situated on a center of gravity thereof.

11. A method for adjusting a difference in a resonance frequency between a tangential vibration and a vertical vibration of a piezoelectric vibration gyroscope, which comprises:

a main body shaped into a rectangular plate and provided with obverse and reverse surfaces functioning as major surfaces, and first and second groups of three arms projecting from said main body in opposite directions and lying on extensions of said major surfaces, wherein said main body and said first and second groups of said three arms are formed of piezoelectric material, said first group of said three arms is composed of two excitation driving side arms vibrating in an opposite phase and a nonexcitation driving side arm inserted between said two excitation driving side arms, said second group of said three arms is composed of two vibration detecting side arms vibrating in an opposite phase and a non vibration detecting side arm inserted between said two vibration detecting side arms, said two excitation driving side arms are respectively provided with driving electrodes for exciting a tangential vibration vibrating in parallel with said major surfaces, and said two vibration driving side arms are respectively provided with detecting electrodes for detecting a vertical vibration vibrating vertically to said major surfaces, comprising the step of:

cutting four corners of said main body.

* * * * *